(12) United States Patent
Yamamoto

(10) Patent No.: US 7,289,270 B2
(45) Date of Patent: Oct. 30, 2007

(54) PROJECTION LENS AND PROJECTION DISPLAY APPARATUS

(75) Inventor: Chikara Yamamoto, Saitama (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 11/582,316

(22) Filed: Oct. 18, 2006

(65) Prior Publication Data

US 2007/0091456 A1    Apr. 26, 2007

(30) Foreign Application Priority Data

Oct. 19, 2005    (JP)    ............... P2005-304597

(51) Int. Cl.
 *G02B 9/00* (2006.01)
(52) U.S. Cl. .................................. 359/649
(58) Field of Classification Search ................ 359/649, 359/650, 651
 See application file for complete search history.

(56) References Cited

FOREIGN PATENT DOCUMENTS

| | | | |
|---|---|---|---|
| JP | 3244606 B2 | 10/2001 | |
| JP | 2002-131636 A | 5/2002 | |
| JP | 2003-156683 A | 5/2003 | |
| JP | 2003-287676 A | 10/2003 | |
| JP | 2004-354405 A | 12/2004 | |

*Primary Examiner*—Scott J. Sugarman
(74) *Attorney, Agent, or Firm*—Birch, Stewart, Kolasch & Birch, LLP

(57) ABSTRACT

A projection lens is provided and includes: in order from the object, a first lens group having a negative refractive power and including an aspheric lens and a double-concave lens in this order from the magnification side; a second lens group having a positive refractive power and including one positive lens or one positive lens and one negative lens; and a third lens group having a positive refractive power, including three to five lenses including a cemented lens portion and a positive lens portion in this order from the magnification side, and including a surface closest to the magnification side as an aspheric surface. The projection lens has a substantially telecentricity on the reduction side, the third lens group has a magnification-side focal position located between the third and second lens groups, the projection lens has the longest air space between the first and second lens groups, and the projection lens satisfies specific conditions.

19 Claims, 16 Drawing Sheets

PROJECTION LENS AND PROJECTION DISPLAY APPARATUS

This application claims foreign priority from Japanese Patent Application No. 2005-304597, filed Oct. 19, 2005, the entire disclosure of which is herein incorporated by reference.

BACKGROUND OF THE INVENTION

1. Field of the Invention

The present invention relates to a transmission-type or reflection-type liquid crystal display device, or a projection lens for enlarging and projecting display information etc. from a light valve such as DMD, and particularly relates to a projection lens suitable for a rear projection display apparatus such as a rear projection TV, and a projection display apparatus using the projection lens.

2. Description of Related Art

Front projection apparatus and rear projection apparatus have been heretofore known as projection display apparatus. In the front projection apparatus, a projection lens is disposed on the same side as a viewer with respect to a screen so that light outgoing from the projection lens is imaged on the reflection type screen. In the rear projection apparatus, a projection lens and a viewer are disposed to put a screen therebetween so that light outgoing from the projection lens is imaged on the transmission type screen.

Of them, the rear projection display apparatus, for example, like a rear projection television set, has a well known configuration in which constituents between the light source and the screen are put in a cabinet, and light carrying video information is projected from the projection lens disposed on the back face of the cabinet toward the screen disposed on the front face of the cabinet.

In recent years, various projection lenses have been proposed as applications to such a cabinet type projection display apparatus.

An optical system using a plurality of light valves to obtain a color image requires a synthesis portion for synthesizing light beams from the light valves. It is therefore necessary to secure a certain amount of spacing for a back focal distance of a projection lens (i.e., on the reduction side). Particularly when a projection lens is used in a rear projection TV, the projection lens has to be made wide-angle. Thus, the back focal distance becomes larger than the focal length of the projection lens. In order to miniaturize the apparatus as a whole, it is necessary to insert a reflecting mirror into the projection lens.

Projection lenses disclosed in JP-A-2002-131636, JP-A-2003-287676 and Japanese Patent No. 3244606 etc. are known as wide-angle projection lenses each with a long back focal distance. In any of the documents, there is no consideration about a space to dispose a reflecting mirror in the projection lens. When the reflecting mirror is disposed in the projection lens, the number of lenses will increase so that the manufacturing cost will increase on a large scale.

Projection lenses disclosed in JP-A-2003-156683 and JP-A-2004-354405 are known as solutions to the aforementioned issue.

According to the projection lens disclosed in JP-A-2003-156683 and JP-A-2004-354405, however, an aspheric surface is disposed on the reduction side with respect to an aperture position, and set at a distance from the aperture position, and thus, the balance of the image plane as a whole deteriorates or there survives a difference between the sagittal and tangential planes. Further, the size of the aspheric surface cannot help increasing so as to increase in cost.

According to the projection lens disclosed in JP-A-2003-156683, the power of an aspheric lens itself is made high. Thus, when the aspheric lens is made of plastic, the shape of the lens is deformed excessively due to a temperature change, causing deterioration in performance.

On the other hand, according to the projection lens disclosed in JP-A-2004-354405, the power of an aspheric lens itself is not so high, but the number of lenses is large to be 9 to 11. Radical improvement to reduce such a large number of lenses is required.

SUMMARY OF THE INVENTION

An object of an illustrative, non-limiting embodiment of the invention is to provide a projection lens which is wide-angle and has a suitable configuration for making the projection lens compact enough to allow disposition of an optical path deflecting unit in the system, and which has high projection performance while the number of lenses constituting the projection lens is reduced so that the manufacturing cost can be reduced. Another object of an illustrative, non-limiting embodiment of the invention is to provide a projection display apparatus using the projection lens.

One aspect of the present invention is a projection lens including a first lens group having a negative refractive power, a second lens group having a positive refractive power, and a third lens group having a positive refractive power, the first to third lens groups being arrayed in this order from a magnification side of the projection lens; wherein:

the first lens group has an aspheric lens and a double-concave lens arrayed in this order from the magnification side;

the second lens group has one positive lens, or one positive lens and one negative lens;

the third lens group has three to five lenses including at least a cemented lens portion and a positive lens portion arrayed in this order from the magnification side, and including a surface closest to the magnification side as an aspheric surface;

the projection lens has a substantially telecentricity on a reduction side thereof;

the third lens has a magnification-side focal position located in an air space between the third lens group and the second lens group;

a space between the first lens group and the second lens group is the longest air space in the projection lens; and the projection lens satisfies the following conditional expressions (1) to (7):

$$-3.5 < f_1/f < -1.2 \tag{1}$$

$$2.5 < f_3/f < 8.0 \tag{2}$$

$$3.5 < D_{12}/f < 15.0 \tag{3}$$

$$2.0 < Bf/f < 8.0 \tag{4}$$

$$7.5 < |ASf_1/f| \tag{5}$$

$$|FFd/f| < 3.0 \tag{6}$$

$$75 \text{ degrees} < 2\omega \tag{7}$$

where:

f designates a focal length of the total system (the projection lens);

$f_1$ designates a focal length of the first lens group;

$f_3$ designates a focal length of the third lens group;

$D_{12}$ designates an air space between the first lens group and the second lens group;

Bf designates an air-basis length (back focal distance) between a reduction-side lens surface of a lens the closest to the reduction side in the third lens group and a reduction-side image plane;

$ASf_1$ designates a focal length of the aspheric lens of the first lens group;

FFd designates a magnification-side focal position of the third lens group; and $2\omega$ designates a magnification side view angle.

Another aspect of the invention is a projection lens including a first lens group having a negative refractive power, a second lens group having a positive refractive power, and a third lens group having a positive refractive power, the first to third lens groups being arrayed in this order from a magnification side of the projection lens; wherein:

the first lens group has an aspheric lens and a double-concave lens arrayed in this order from the magnification side;

the second lens group has one positive lens, or one positive lens and one negative lens;

the third lens group has three to five lenses including at least a cemented lens portion and a positive lens portion arrayed in this order from the magnification side, and including a surface the closest to the magnification side as an aspheric surface;

the projection lens has a substantially telecentricity on a reduction side thereof;

the second and third lens groups constitutes a composite lens group having a magnification-side focal position located in an air space between the second lens group and the first lens group;

the projection lens has a space between the first lens group and the second lens group, the space being the longest air space in the projection lens; and the projection lens satisfies the following conditional expressions (1) to (7):

$$-3.5 < f_1/f < -1.2 \quad (1)$$

$$2.5 < f_3/f < 8.0 \quad (2)$$

$$3.5 < D_{12}/f < 15.0 \quad (3)$$

$$2.0 < Bf/f < 8.0 \quad (4)$$

$$7.5 < |ASf_1/f| \quad (5)$$

$$|FFd/f| < 3.0 \quad (6)$$

$$75 \text{ degrees} < 2\omega \quad (7)$$

where:

f designates a focal length of the total system (the projection lens);

$f_1$ designates a focal length of the first lens group;

$f_3$ designates a focal length of the third lens group;

$D_{12}$ designates an air space between the first lens group and the second lens group;

Bf designates an air-basis length (back focal distance) between a reduction-side lens surface of a lens the closest to the reduction side in the third lens group and a reduction-side image plane;

$ASf_1$ designates a focal length of the aspheric lens of the first lens group;

FFd designates a magnification-side focal position of the composite lens group of the second and third lens groups; and $2\omega$ designates a magnification side view angle.

Preferably the second projection lens further satisfies the following conditional expression (8):

$$D_{23}/f < 2.0 \quad (8)$$

where $D_{23}$ designates an air space between the second lens group and the third lens group.

Preferably each of the aforementioned projection lenses has any one of the following configurations.

That is, it is preferable that the third lens group has at least a single aspheric lens, the cemented lens portion and the positive lens portion arrayed in this order from the magnification side and satisfies the following conditional expression (9), the single aspheric lens having an aspheric surface on the magnification side, the cemented lens portion having two or three lenses cemented with each other, the positive lens portion having a single lens:

$$10.0 < |ASf_3/f| \quad (9)$$

where $ASf_3$ designates a focal length of the single aspheric lens in the third lens group.

Alternatively it is preferable that the third lens group has a single aspheric lens, the cemented lens portion and the positive lens portion arrayed in this order from the magnification side and satisfies the following conditional expression (9), the single aspheric lens having an aspheric surface formed on the magnification side, the cemented lens portion having one negative lens and one positive lens cemented with each other, the positive lens portion having a single lens or a cemented lens consisting of two lenses cemented with each other:

$$10.0 < |ASf_3/f| \quad (9)$$

where $ASf_3$ designates a focal length of the single aspheric lens in the third lens group.

Alternatively it is preferable that the third lens group has the cemented lens portion and the positive lens portion arrayed in this order from the magnification side, the cemented lens portion consisting of two or three lenses cemented with each other, while a surface of the cemented lens portion closest to the magnification side is formed as the aspheric surface. In this case, it is more preferable that the surface of the cemented lens portion, closest to the magnification side, is additionally provided with a resin layer, and the aspheric surface is formed in the resin layer.

Preferably in any one of the aforementioned projection lenses, the second lens group consists of one positive lens.

In any one of the aforementioned projection lenses, an optical path deflection unit for deflecting the optical path may be disposed between the first lens group and the second lens group.

The aspheric lens disposed the most closely to the magnification side in the first lens group may be moved in an optical axis direction of the first lens group in accordance with a change of a projection distance so as to correct a field curvature caused by the change of the projection distance.

Further a projection display apparatus according one aspect of to the invention includes a light source, a light valve, a lighting optical portion for guiding a light beam from the light source to the light valve, and any one of the aforementioned projection lenses, wherein the light beam from the light source is optically modulated by the light valve and projected on a screen by the projection lens.

BRIEF DESCRIPTION OF THE DRAWINGS

The features of the invention will appear more fully upon consideration of the exemplary embodiments of the inventions, which are schematically set forth in the drawings, in which.

DETAILED DESCRIPTION OF THE EXEMPLARY EMBODIMENTS

Although the invention will be described below with reference to the exemplary embodiments thereof, the following exemplary embodiments and modifications do not restrict the invention.

According to exemplary embodiments, a projection lens is wide-angle and has a suitable configuration for making the projection lens compact enough to allow disposition of an optical path deflecting unit such as a mirror in the system. In addition, the projection performance can be improved while the number of lenses constituting the projection lens is reduced so that the manufacturing cost can be reduced.

A projection display apparatus according to an exemplary embodiment of the invention using the projection lens according to the invention can be made low in height and low in profile. In addition, the projection display apparatus can obtain a high-resolution and large-screen image where various aberrations are corrected in a balanced manner.

Figure 1:
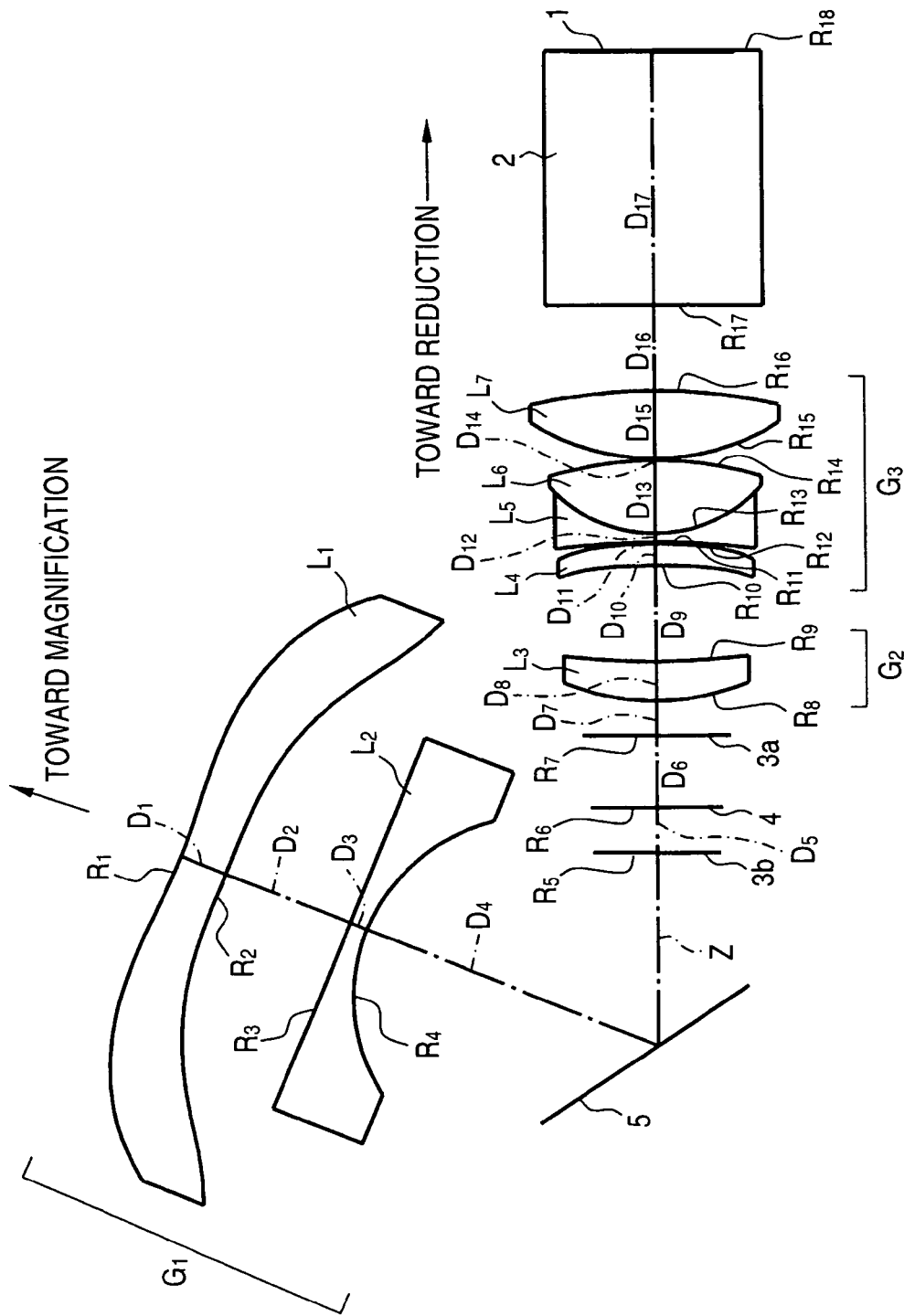
FIG. 1 is a diagram showing a projection lens of Embodiment 1 according to one aspect the invention.

Exemplary embodiments of the invention will be described below with reference to the drawings. FIG. 1 is a diagram (lens configuration diagram of Embodiment 1 which will be described later) showing a projection lens according to one aspect of the invention. This lens will be described later as a representative of this embodiment. The reference sign Z in FIG. 1 designates an optical axis.

In the projection lens according to this embodiment, a first lens group $G_1$ having a negative refractive power, a mask $3b$, an aperture stop 4, a mask $3a$, a second lens group $G_2$ having a positive refractive power, and a third lens group $G_3$ having a positive refractive power are arrayed in this order from the magnification side. The reduction side of the projection lens is formed to be substantially telecentric. In this case, in order to form the telecentric configuration, the aperture stop 4 is placed substantially at the magnification-side focal position of a composite lens group of the second lens group $G_2$ and the third lens group $G_3$ (see Embodiments 1, 2 and 9). In the specification, "a magnification-side focal position" means a distance, along the optical axis, between an apex of a lens surface of a lens or lens group the closest to the magnification side and the magnification-side focal point.

The aperture stop 4 may be placed between the second lens group $G_2$ and the third lens group $G_3$ (see Embodiments 3-8 and 10). In this case, the aperture stop 4 is placed substantially at the magnification-side focal position of the third lens group $G_3$.

Due to the masks $3a$ and $3b$ disposed thus, the telecentricity can be improved, and ghosts can be reduced. The masks $3a$ and $3b$ may be placed between the second lens group $G_2$ and the third lens group $G_3$. Further, the number of masks disposed is not limited to two, but the masks may be omitted.

Further, in the first lens group $G_1$, an aspheric lens $L_1$ having a low power and a double-concave lens $L_2$ are arrayed in this order from the magnification side.

The second lens $L_2$ of the first lens group $G_1$ from the magnification side is constituted by a double-concave lens for the following reason. That is, if the second lens $L_2$ were constituted by a negative meniscus lens having a convex surface facing the magnification side, light radiated to the first aspheric lens $L_1$ and reflected by its lens surface would be reflected by the convex surface of the second lens $L_2$ again and imaged on a screen easily. Thus, there would occur ghosts. When the second lens $L_2$ is formed as a double-concave lens, the occurrence of ghosts can be prevented.

The aspheric lens $L_1$ is designed to be moved in the optical axis direction of the first lens group $G_1$ in accordance with a change of a projection distance, so as to correct a field curvature caused by the change of the projection distance. The field curvature is corrected only by the movement of the aspheric lens $L_1$. Thus, adjustment becomes easy, and workability is also improved. Formation of the adjustment lens as the aspheric lens is also advantageous in view from adjustment of an aberration variation. Focus adjustment may be performed by moving the first lens group $G_1$ in the optical axis Z.

In FIG. 1, the second lens group $G_2$ is constituted by one positive lens $L_3$. However, the second lens group $G_2$ may be constituted by one positive lens and one negative lens (in Embodiments 5 and 10, a cemented lens constituted by one positive lens and one negative lens).

In the third lens group $G_3$, at least a cemented lens portion and a positive lens portion are arrayed in this order from the magnification side. The third lens group $G_3$ is constituted by a required minimum number of lens ranging from three to five. In FIG. 1, the third lens group $G_3$ is constituted by a single aspheric lens $L_4$, a cemented lens portion and a positive lens portion which are arrayed in this order from the magnification side. The single aspheric lens $L_4$ has an aspheric surface formed on the magnification side. The cemented lens portion has one negative lens $L_5$ and one positive lens $L_6$ cemented with each other. The positive lens portion has a single positive lens $L_7$.

The positive lens portion may be constituted by a cemented consisting of two lenses (see Embodiment 2). The cemented lens portion may be constituted by a cemented lens consisting of three or four lenses (see Embodiments 3, 5, 6 and 10).

In the third lens group $G_3$, the surface the closest to the magnification side is formed as an aspheric surface, and this aspheric surface is located in a position near the magnification-side focal position of the composite lens group of the second and third lens groups $G_2$ and $G_3$ (see Embodiments 1, 2, and 9). Also in Embodiments 3 to 8 and Embodiment 10, in the third lens group $G_3$, the surface the closest to the magnification side is formed as an aspheric surface. In this case, the aspheric surface is also located in a position near the magnification-side focal position of the third lens group $G_3$.

In the third lens group $G_3$, the aspheric surface formed the most closely to the magnification side is formed in a single lens (one or both surfaces thereof) as shown in FIG. 1. Alternatively, the aspheric surface may be formed directly in the surface of the cemented lens portion the closest to the magnification side, or may be formed in a thin resin layer additionally provided in the surface of the cemented lens portion the closest to the magnification side (see Embodiments 9 and 10).

That is, in the projection lens according to this embodiment, the aspheric surface is placed as closely to the position of the aperture stop 4 (the magnification-side focal position of the corresponding lens group) as possible. The reduction-side telecentricity depends on the position of the aperture stop 4. Thus, the aberration balance of the image plane as a whole can be improved so that the difference between the sagittal plane and the tangential plane can be reduced, and further the size of the aspheric surface can be reduced. Since the size of the aspheric surface can be made smaller, the manufacturing cost can be reduced.

In the projection lens shown in FIG. 1, a light beam is incident on a light valve 1 from the right side of the paper, and given image information in the light valve 1. The light beam is incident on the projection lens through a glass block 2. The light beam is projected toward the magnification side by the projection lens. In FIG. 1, only one light valve 1 is shown for the sake of easiness in viewing. In some projection display apparatus, a light beam from a light source is separated into three primary color light beams by a color separation optics, and three light valves are disposed for the primary color light beams respectively so that a full color image can be displayed. When a color synthesis unit such as a cross dichroic prism is disposed in the position of the glass block 2, the three primary color light beams can be synthesized.

Since the projection lens is designed to be telecentric on the reduction side, the projection lens is also suitable for the configuration where the color synthesis unit is disposed as the glass block 2.

In the projection lens according to this embodiment, the longest air space in the projection lens is placed between the first lens group $G_1$ and the second lens group $G_2$. A mirror 5 serving as an optical path deflection unit for deflecting an optical path is disposed in this air space.

The projection lens according to this embodiment satisfies the following conditional expressions (1) to (7).

$$-3.5 < f_1/f < -1.2 \tag{1}$$

$$2.5 < f_3/f < 8.0 \tag{2}$$

$$3.5 < D_{12}/f < 15.0 \tag{3}$$

$$2.0 < Bf/f < 8.0 \tag{4}$$

$$7.5 < |ASf_1/f| \tag{5}$$

$$|FFd/f| < 3.0 \tag{6}$$

$$75 \text{ degrees} < 2\omega \tag{7}$$

where:
f designates a focal length of the total system;
$f_1$ designates a focal length of the first lens group;
$f_3$ designates a focal length of the third lens group;
$D_{12}$ designates an air space between the first lens group and the second lens group;
Bf designates an air-basis length (back focal distance) between a reduction-side lens surface of a lens the closest to the reduction side in the third lens group and a reduction-side image plane;
$ASf_1$ designates a focal length of the aspheric lens of the first lens group;
FFd designates a magnification-side focal position of the third lens group; and
$2\omega$ designates a magnification side view angle.

When the aperture stop 4 is placed between the second lens group $G_2$ and the third lens group $G_3$ as described above, it is preferable that the projection lens satisfies the following conditional expression (8).

$$D_{23}/f < 2.0 \tag{8}$$

where $D_{23}$ designates an air space between the second lens group and the third lens group.

Further, it is preferable that the projection lens satisfies the following conditional expression (9).

$$10.0 < |ASf_3/| \tag{9}$$

where $ASf_3$ designates a focal length of the single aspheric lens in the third lens group.

When the projection lens is configured thus according to this embodiment, the projection lens is wide-angle and has a suitable configuration for making the projection lens compact enough to allow disposition of the mirror 5 in the system. In addition, the projection performance can be improved while the number of lenses constituting the projection lens is reduced so that the manufacturing cost can be reduced. The aforementioned constituents are set correlatively. Accordingly, when at least the conditional expressions (1) to (7) are satisfied, the aforementioned operations and effects can be obtained. Therefore, description will be first made about the conditional expressions (1) to (7) having comparatively great influence on the operations and effects respectively. Description will be then made about the conditional expressions (8) and (9) which should be preferably satisfied.

The conditional expression (1) defines the ratio of the focal length $f_1$ of the first lens group $G_1$ to the focal length f of the total system. If the ratio is lower than the lower limit, the power of the first lens group $G_1$ will be so low that the size of the first lens group $G_1$ will be increased, or the back focal distance will be shortened. On the contrary, if the ratio is higher than the upper limit, the power of the first lens group $G_1$ will be so high that it will be difficult to correct aberration.

The conditional expression (2) defines the ratio of the focal length $f_3$ of the third lens group $G_3$ to the focal length f of the total system. If the ratio is lower than the lower limit, the power of the third lens group $G_3$ will be so high that it will be difficult to correct aberration. On the contrary, if the ratio is higher than the upper limit, the power of the third lens group $G_3$ will be so low that the back focal distance will be too long. As a result, the size of the total system of the projection lens will be increased.

The conditional expression (3) is established to secure an air space where the mirror 5 for deflecting the optical path can be disposed between the first lens group $G_1$ and the second lens group $G_2$, and to make the system compact. If the ratio is lower than the lower limit, it will be difficult to place the mirror 5 or the deflection (bending) angle will be limited. The manner to dispose the mirror 5 for deflecting the optical path in the aforementioned position is effective in making the rear projection display apparatus compact. On the contrary, if the ratio is higher than the upper limit, the size of the first lens group $G_1$ will be increased.

The conditional expression (4) defines the back focal distance of the projection lens. The conditional expression (4) establishes a necessary and sufficient back focal distance required for the space where a prism or the like for color synthesis is disposed on the reduction side of the projection lens. If the ratio is lower than the lower limit, it will be difficult to insert the prism or the like for color synthesis. On the contrary, if the ratio is higher than the upper limit, the size of the projection lens as a whole will be increased.

The conditional expression (5) defines the focal length of the aspheric lens of the first lens group $G_1$. If the ratio is lower than the lower limit, it will be difficult to use a material such as plastic, which is low in price but vulnerable to a temperature change, as an aspheric surface forming portion.

The conditional expression (6) defines the magnification side focal point of the composite lens group of the second lens group $G_2$ and the third lens group $G_3$, or the magnification side focal point of the third lens group $G_3$. If the ratio is higher than the upper limit, the position of the aspheric surface of the third lens group $G_3$ will be too far from the aperture position. Thus, the field curvature or the astigmatic difference will be so excessive that the size of the aspheric surface of the third lens group $G_3$ will be increased, and the cost will be increased.

The conditional expression (7) defines the magnification side view angle $2\omega$. If the angle is smaller than the lower limit, the size of the apparatus as a whole will be increased.

The conditional expression (8) defines the magnification side air space between the second lens group $G_2$ and the third lens group $G_3$. If the ratio is higher than the upper limit, the position of the aspheric surface of the third lens group $G_3$ will be too far from the aperture position. Thus, the field curvature or the astigmatic difference will be so excessive that the size of the aspheric surface of the third lens group $G_3$ will be increased, and the cost will be increased.

The conditional expression (9) defines the focal length of the single aspheric lens of the third lens group $G_3$. If the ratio is lower than the lower limit, it will be difficult to use a material such as plastic, which is low in price but vulnerable to a temperature change, as an aspheric surface forming portion.

Next, description will be made about an embodiment of a projection display apparatus according to the invention.

Figure 11:
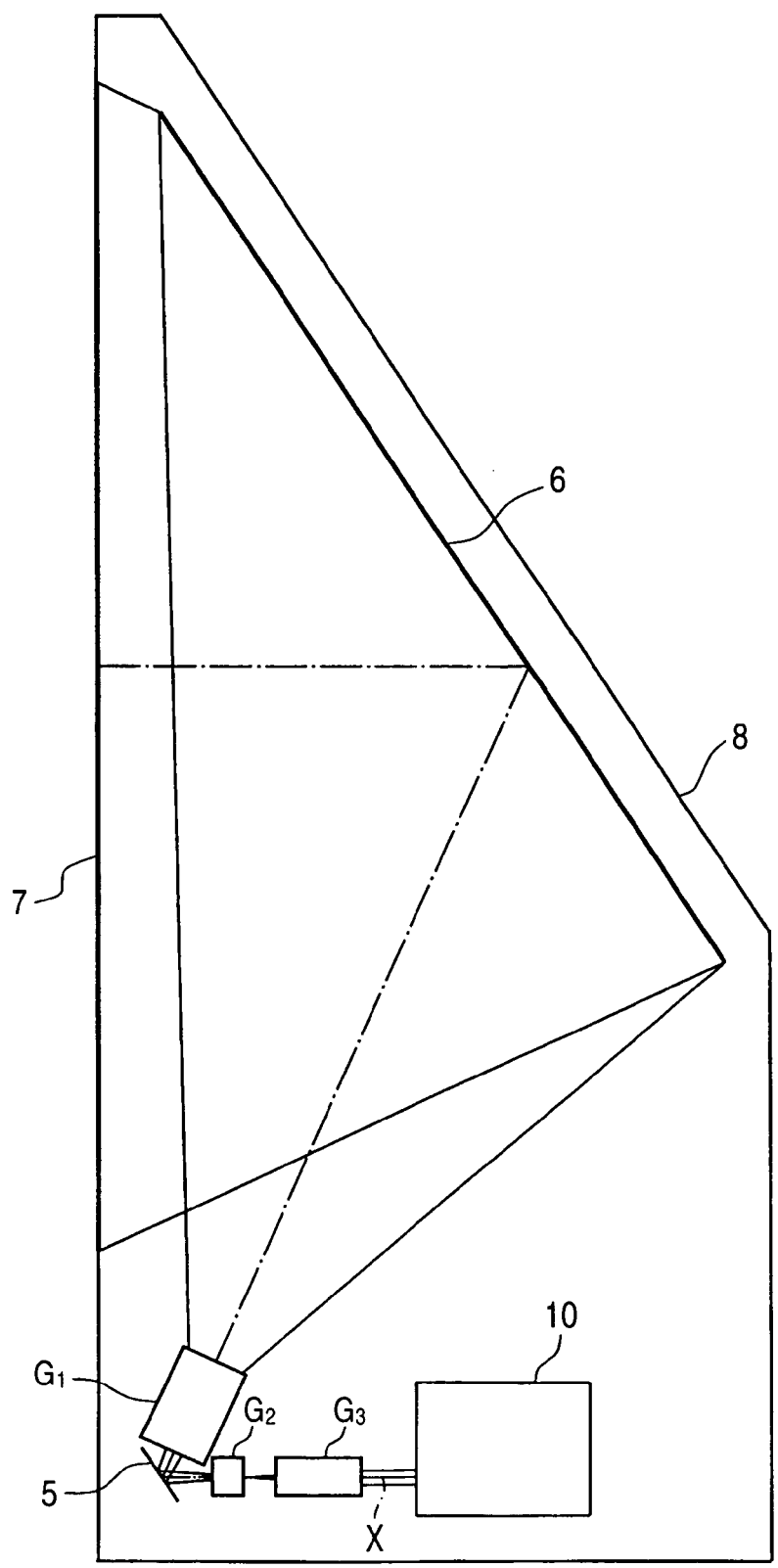
FIG. 11 is a diagram showing a schematic configuration of a projection display apparatus according to one aspect of the invention.
Figure 12:
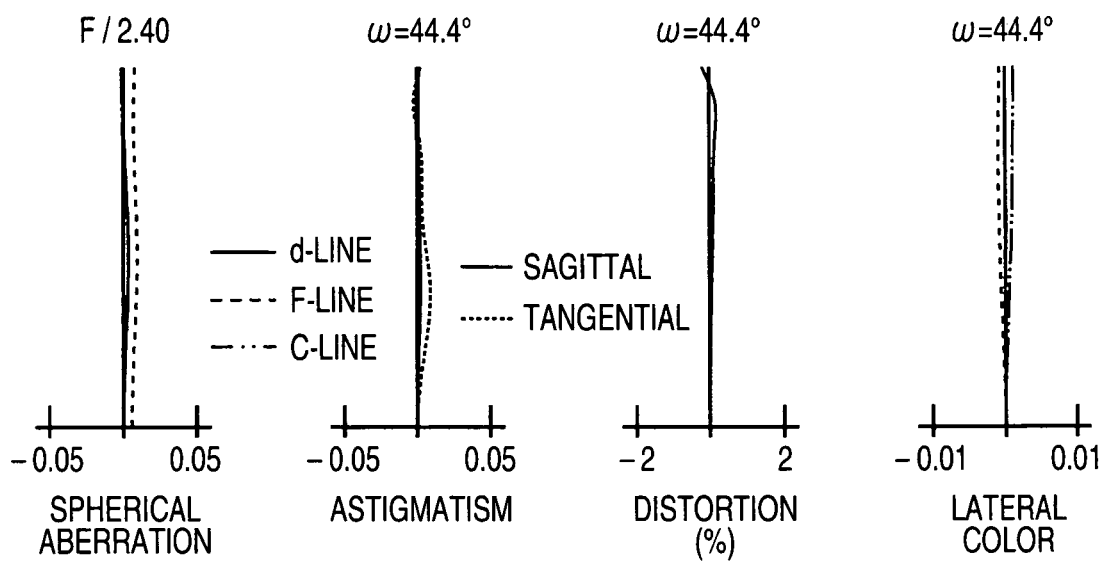
FIG. 12 shows various aberration diagrams of the projection lens according to Embodiment 1.
Figure 13:
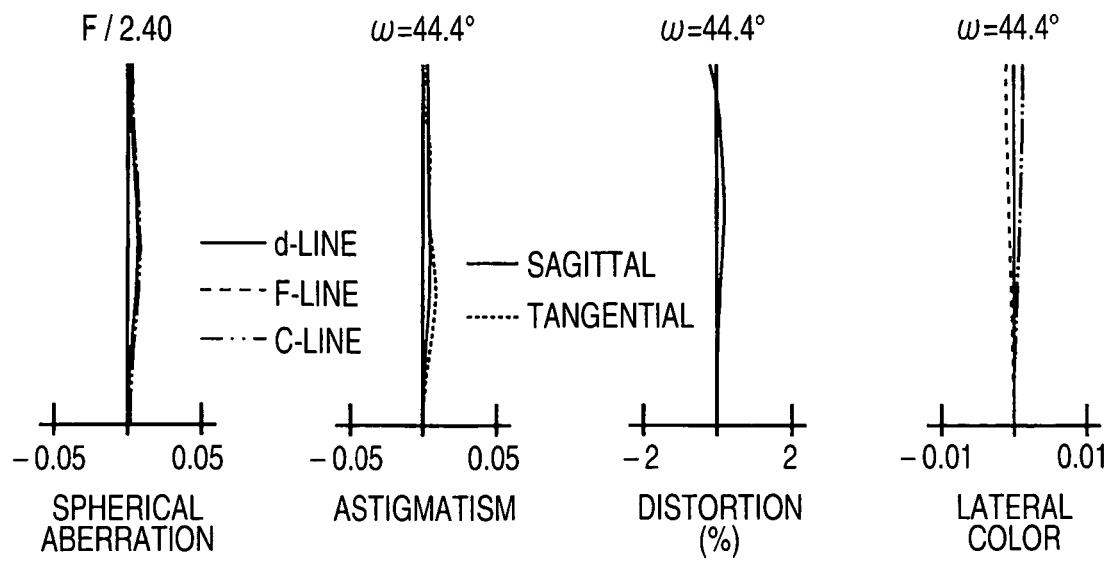
FIG. 13 shows aberration diagrams of the projection lens according to Embodiment 2.
Figure 14:
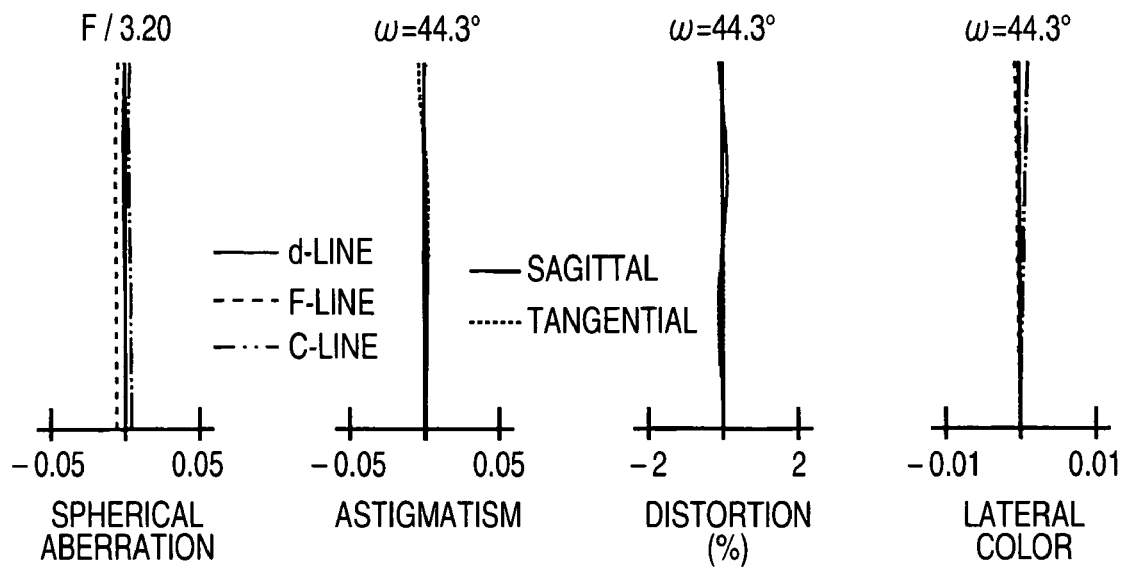
FIG. 14 shows various aberration diagrams of the projection lens according to Embodiment 3.
Figure 15:
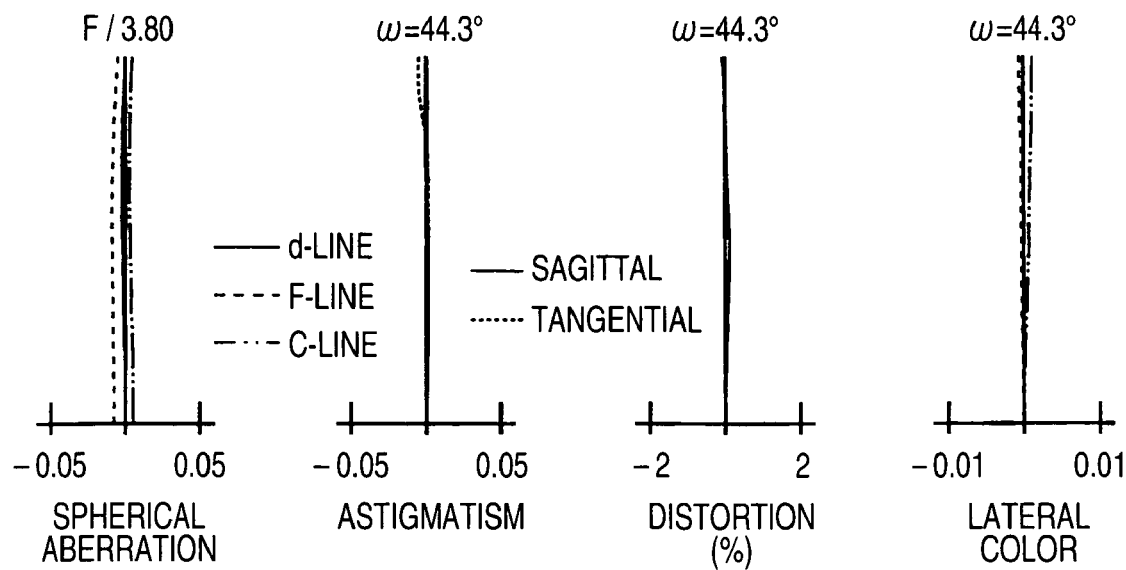
FIG. 15 shows various aberration diagrams of the projection lens according to Embodiment 4.
Figure 16:
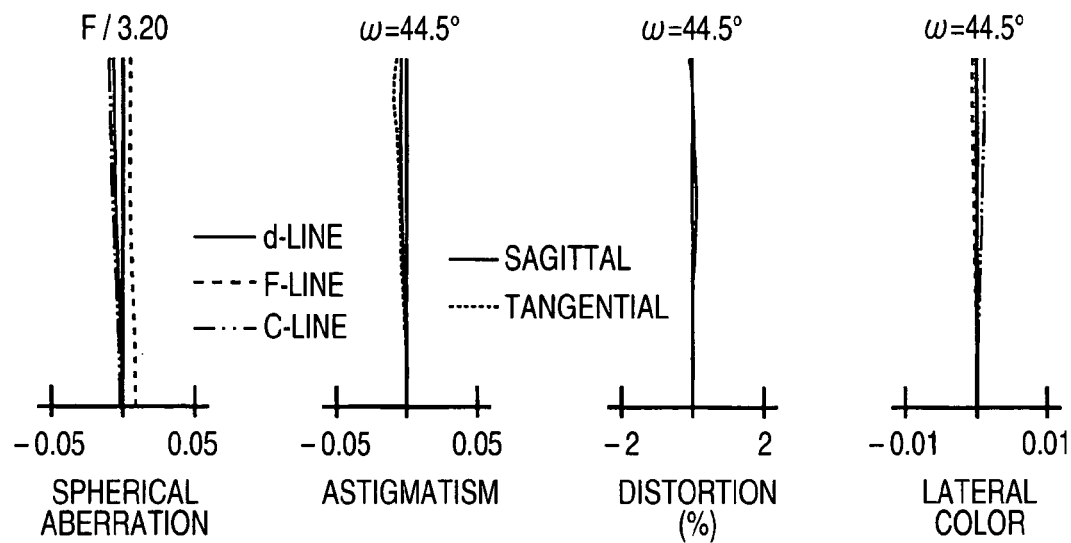
FIG. 16 shows various aberration diagrams of the projection lens according to Embodiment 5.
Figure 17:
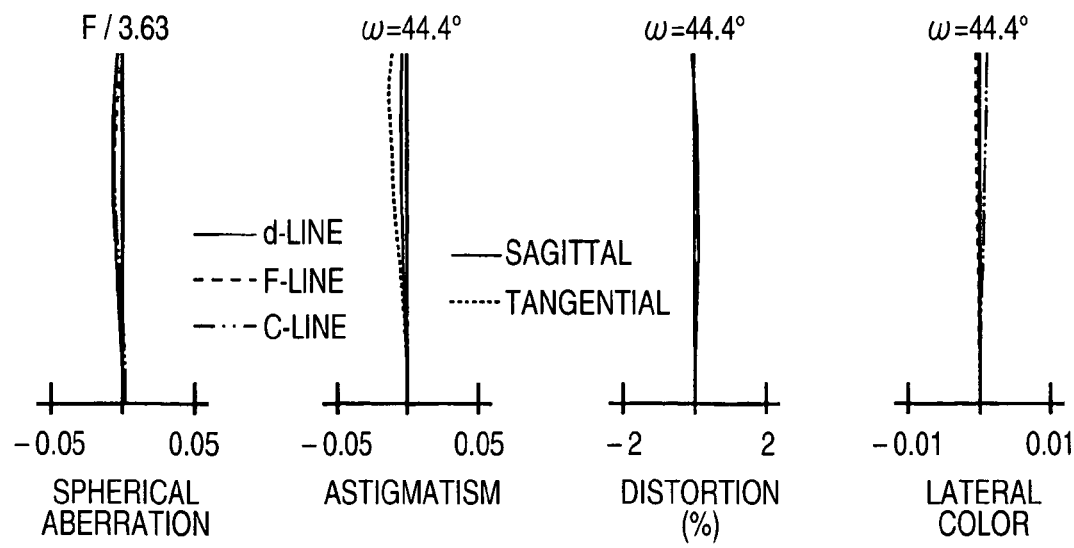
FIG. 17 shows various aberration diagrams of the projection lens according to Embodiment 6.
Figure 18:
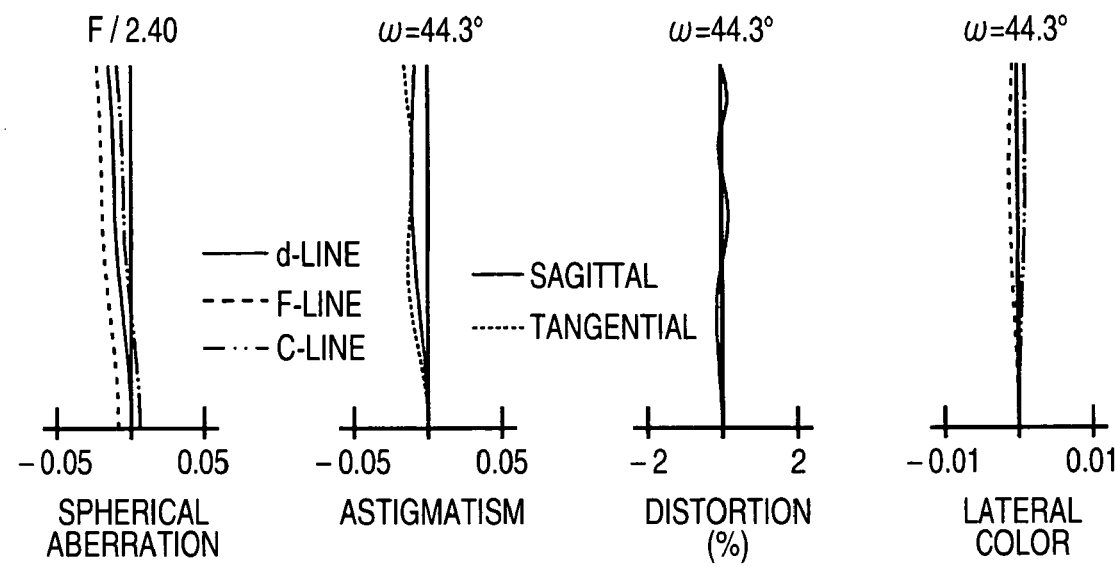
FIG. 18 shows various aberration diagrams of the projection lens according to Embodiment 7.
Figure 19:
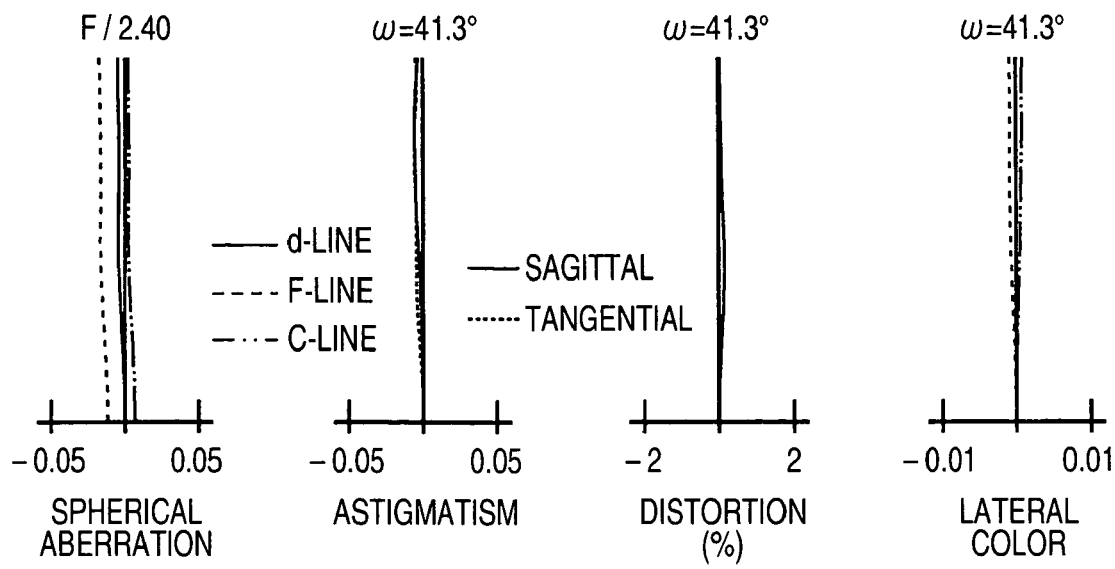
FIG. 19 shows various aberration diagrams of the projection lens according to Embodiment 8.
Figure 20:
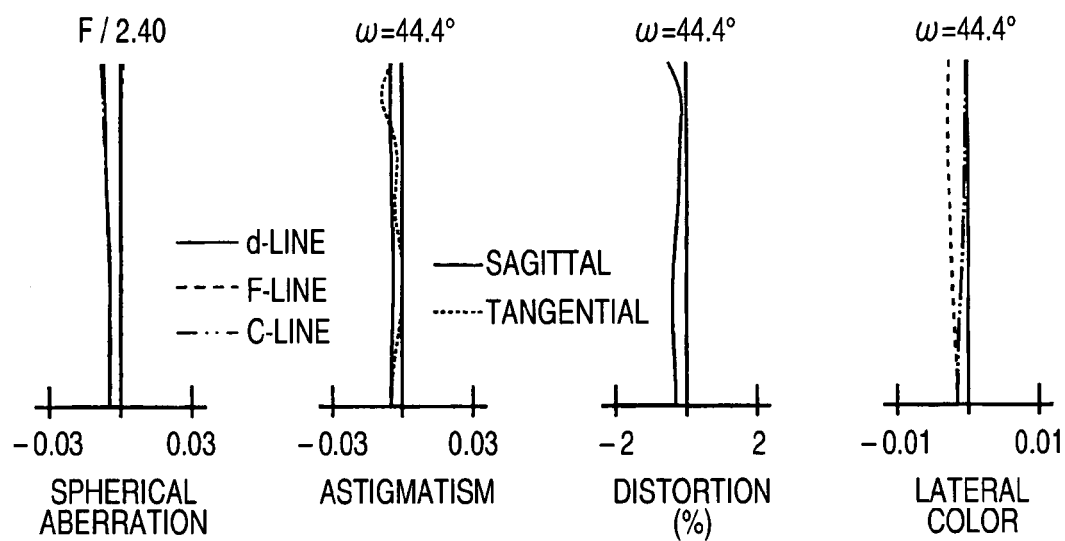
FIG. 20 shows various aberration diagrams of the projection lens according to Embodiment 9.
Figure 21:
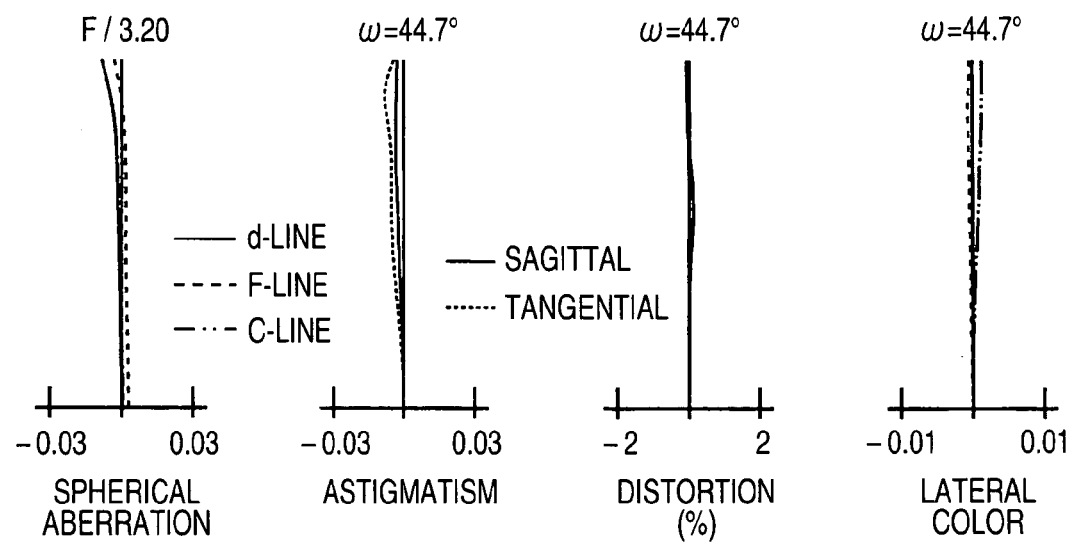
FIG. 21 shows various aberration diagrams of the projection lens according to Embodiment 10.

The projection display apparatus shown in FIG. 11 is a rear projection display apparatus particularly serving to bring about the operation and effect of the aforementioned projection lens. In the projection display apparatus, a light source, light valves, and a lighting optical portion for guiding a light beam from the light source to the light valves are included in a lighting optics 10 shown in FIG. 11. The lighting optics 10 and the aforementioned projection lens are put in a cabinet 8. Beams from the light source are optically modulated by the light valves. The light beams carrying image information thus are projected on the back surface of a screen 7 through the projection lens and a back mirror 6. The screen 7 is placed at a predetermined distance. A viewer views an image enlarged and projected on the screen 7, from the front surface side (left side in the paper) of the screen 7.

The lighting optics 10 has the light valves, a dichroic mirror for color separation, a cross dichroic prism for color synthesis, a condenser lens, and a total reflection mirror. White light from the light source is separated into three color light beams (G light beam, B light beam and R light beam) through the lighting optical portion, and put into the corresponding light valves respectively so as to be optically modulated. Thus, the light beams are projected on the screen 7 by the lens groups $G_1$, $G_2$ and $G_3$ of the projection lens shown in FIG. 1.

Since the projection display apparatus uses the projection lens according to the invention, a large screen having various aberrations corrected in a balanced manner and having high resolution can be obtained. In addition, the projection display apparatus can be made short in height and low in profile due to the configuration where the mirror 5 for deflecting an optical path is disposed between the first lens group $G_1$ and the second lens group $G_2$ of the projection lens so as to bend the optical path at an acute angle.

Description will be made below about Embodiments 1 to 10 which are specific examples of projection lenses according to the invention. In each drawing showing the configuration of each example, members having similar operation and effect to those of Embodiment 1 shown in FIG. 1 are referenced correspondingly. Each piece of data shown below is defined so that the focal length f of the total system will be 1.

<Embodiment 1>

As shown in FIG. 1, in a projection lens according to Embodiment 1, a first lens group $G_1$ having a negative refractive power, a mirror 5 serving as an optical path deflection unit, a mask 3b, an aperture stop 4, a mask 3a, a second lens group $G_2$ having a positive refractive power, and a third lens group $G_3$ having a positive refractive power are arrayed in this order from the magnification side. The reduction side of the projection lens is formed to be substantially telecentric. In this case, in order to form the telecentric configuration, the aperture stop 4 is placed substantially in agreement with the magnification-side focal position of a composite lens group of the second lens group $G_2$ and the third lens group $G_3$.

The first lens group $G_1$ is constituted by a first lens $L_1$ and a second lens $L_2$ arrayed in this order from the magnification side. The first lens $L_1$ is an aspheric lens having a low refractive power. The aspheric lens has an aspheric surface in either side. The second lens $L_2$ is a double-concave lens. A higher curvature concave surface faces the reduction side.

The second lens group $G_2$ is constituted by one positive meniscus lens $L_3$ having a convex surface facing the magnification side.

The third lens group $G_3$ is constituted by four lenses as follows. That is, a single aspheric lens $L_4$, a positive cemented lens portion and a positive lens portion are arrayed in this order from the magnification side. The aspheric lens $L_4$ has a low refractive power, has an aspheric surface in either side, and includes a convex surface facing the reduction side. The cemented lens portion consists of one negative lens $L_5$ and one positive lens $L_6$ cemented with each other. The positive lens portion consists of a single positive lens $L_7$.

The shape of each of the aforementioned aspheric surfaces is defined by the following aspheric surface expression. Effect can be obtained even if the first lens $L_1$ and the fourth lens $L_4$ having the aspheric surfaces are lenses each having an aspheric surface in only one side. It is, however, preferable that they are lenses each having an aspheric surface in either side.

Aspheric Surface Expression $$Z = \frac{Y^2/R}{1+\sqrt{1-K \times Y^2/R^2}} + \sum_{i=3}^{15} A_i Y^i$$

where:

Z designates the length of a perpendicular line dropped on a tangent plane (perpendicular to an optical axis) of an aspheric vertex from a point on the aspheric surface at a distance Y from the optical axis;

Y designates the distance from the optical axis;

R designates the curvature radius of the aspheric surface near the optical axis;

K designates eccentricity; and $A_i$ designates an aspheric coefficient (i=3 to 15)

The projection lens according to Embodiment 1 is designed to satisfy the aforementioned conditional expressions (1) to (9).

Table 1 shows values of a curvature radius R of each lens surface of the projection lens according to Embodiment 1, a center thickness of each lens and an inter-lens air space (hereinafter referred to as "axial spacing") D, a refractive index Nd of each lens for a d-line, and Abbe number $\nu_d$ of each lens for the d-line. The surface numbers in Table 1 and the following tables designate the order from the magnification side. Each surface with the mark * on the right side of its surface number is formed as an aspheric surface. In Embodiment 1 and the following Embodiments 2-10, the curvature radius R of each of the aspheric surfaces is expressed as a value of the curvature radius R on the optical path Z in each table. In some of the lens configuration diagrams corresponding to Embodiments 1-10, however, for the sake of easiness in viewing the diagram, leader lines are not always drawn from intersection points with the optical axis Z.

TABLE 1

| surface number | R | D | $N_d$ | $\nu_d$ |
| --- | --- | --- | --- | --- |
| 1* | −5.9418 | 0.5923 | 1.49100 | 57.6 |
| 2* | −30.5513 | 1.6154 | | |
| 3 | −155.2487 | 0.2154 | 1.63282 | 46.1 |
| 4 | 2.2501 | 6.1813 | | |
| 5 | ∞ | 0.5660 | (mask) | |
| 6 | ∞ | 0.8879 | (stop) | |
| 7 | ∞ | 0.4308 | (mask) | |
| 8 | 2.8218 | 0.4884 | 1.83499 | 23.3 |
| 9 | 9.4162 | 1.1866 | | |
| 10* | −9.6158 | 0.2692 | 1.49100 | 57.6 |
| 11* | −5.9173 | 0.0215 | | |
| 12 | −8.8270 | 0.1077 | 1.79876 | 25.1 |
| 13 | 1.6804 | 0.9116 | 1.49700 | 81.6 |
| 14 | −4.2928 | 0.0215 | | |
| 15 | 2.7495 | 0.8472 | 1.49700 | 81.6 |
| 16 | −6.6352 | 1.0587 | | |
| 17 | ∞ | 3.1514 | 1.51633 | 64.1 |
| 18 | ∞ | | | |

The mark * designates an aspheric surface.

Table 2 shows values of constants K and $A_3$-$A_{15}$ corresponding to each aspheric surface.

TABLE 2

| Surface number | K | $A_3$ | $A_4$ | $A_5$ | $A_6$ | $A_7$ | $A_8$ |
| --- | --- | --- | --- | --- | --- | --- | --- |
| 1 | −0.0357 | 2.1928 × 10⁻² | 1.3091 × 10⁻² | 1.9834 × 10⁻⁵ | −1.7661 × 10⁻³ | 2.3730 × 10⁻⁶ | 1.6083 × 10⁻⁴ |
| 2 | 0.7364 | 1.6837 × 10⁻² | 1.4456 × 10⁻² | −1.0574 × 10⁻⁴ | −1.4120 × 10⁻³ | −8.6498 × 10⁻⁵ | 5.3253 × 10⁻⁵ |
| 10 | 1.0000 | 0.0000 | −2.9949 × 10⁻² | 7.5706 × 10⁻³ | −1.0904 × 10⁻² | −3.6429 × 10⁻³ | 1.5771 × 10⁻³ |
| 11 | 1.0000 | 0.0000 | −1.1157 × 10⁻² | −1.6830 × 10⁻² | 6.2664 × 10⁻³ | −4.3991 × 10⁻⁴ | −2.9773 × 10⁻³ |

| surface number | $A_9$ | $A_{10}$ | $A_{11}$ | $A_{12}$ | $A_{13}$ | $A_{14}$ | $A_{15}$ |
| --- | --- | --- | --- | --- | --- | --- | --- |
| 1 | −3.3774 × 10⁻⁸ | −9.1095 × 10⁻⁶ | −1.8635 × 10⁻⁷ | 3.8167 × 10⁻⁷ | −1.3001 × 10⁻⁸ | 1.6083 × 10⁻⁴ | −3.3774 × 10⁻⁸ |
| 2 | 3.5141 × 10⁻⁶ | 4.5028 × 10⁻⁶ | 1.8623 × 10⁻⁶ | −1.0458 × 10⁻⁶ | −3.3033 × 10⁻⁹ | −3.8325 × 10⁻⁹ | 5.5827 × 10⁻⁹ |
| 10 | 1.8424 × 10⁻³ | 7.7124 × 10⁻⁵ | −4.1776 × 10⁻³ | −1.8989 × 10⁻⁴ | 0.0000 | 0.0000 | 0.0000 |
| 11 | −2.4045 × 10⁻³ | −1.8436 × 10⁻³ | −5.0127 × 10⁻⁴ | 8.7095 × 10⁻⁵ | 0.0000 | 0.0000 | 0.0000 |

Values corresponding to the conditional expressions (1) to (9) in Embodiment 1 are shown in Table 21 which will be described later. Thus, all the conditional expressions (1) to (9) are satisfied.

<Embodiment 2>

Figure 2:
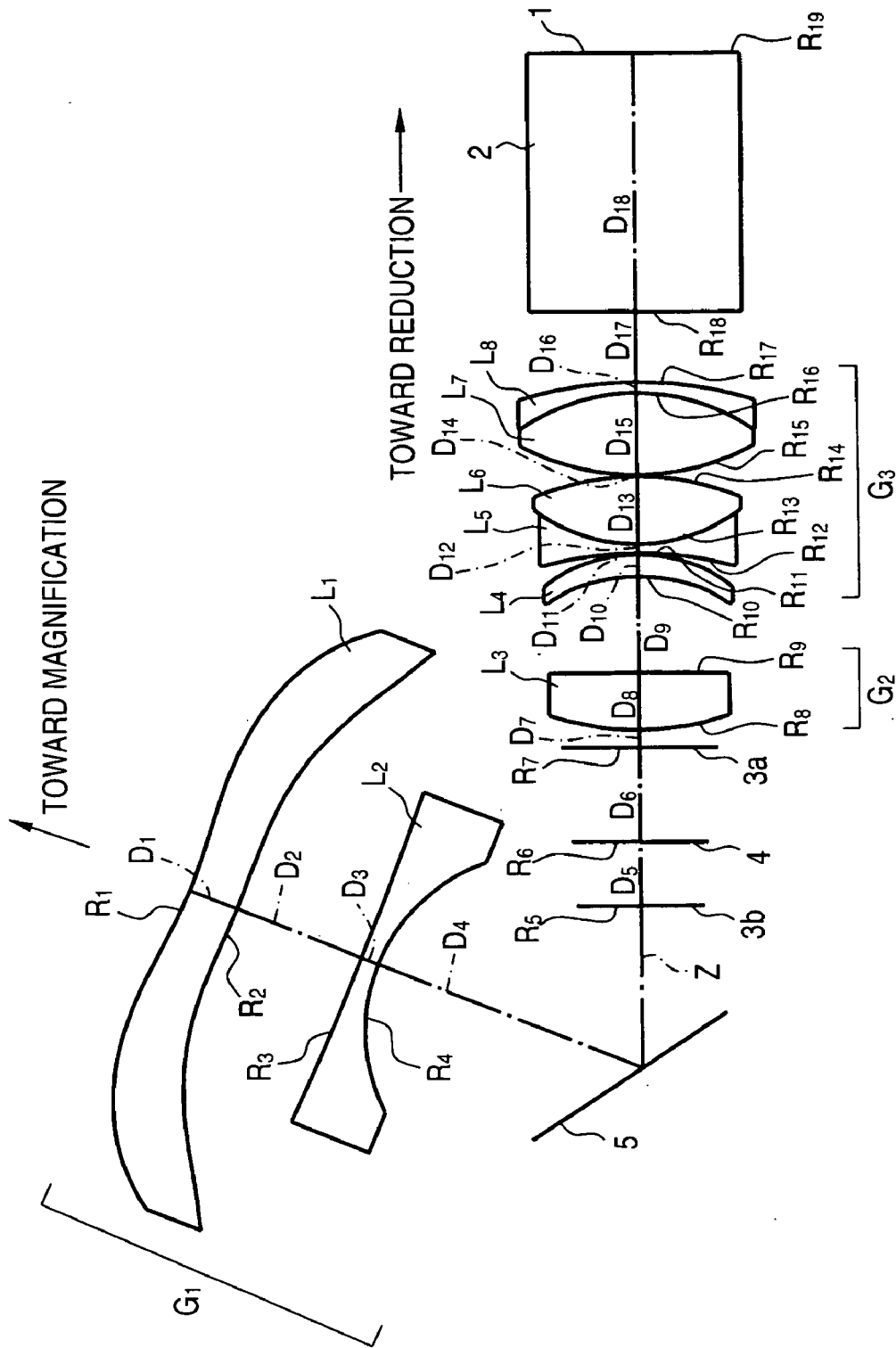
FIG. 2 is a diagram showing a projection lens of Embodiment 2 according to one aspect the invention.

A projection lens according to Embodiment 2 has a configuration similar to that of the projection lens according to Embodiment 1, as shown in FIG. 2. Parts the same as those of the projection lens according to Embodiment 1 will not be described.

The projection lens according to Embodiment 2 is different from the projection lens according to Embodiment 1 in the following points. That is, the second lens group $G_2$ is constituted by one double-convex lens $L_3$ having a higher curvature convex surface facing the magnification side.

Further, the third lens group $G_3$ is constituted by five lenses as follows. That is, the third lens group $G_3$ has a single aspheric lens $L_4$, a positive cemented lens portion and a positive lens portion which are arrayed in this order from the magnification side. The aspheric lens $L_4$ has a low refractive power. An aspheric surface is formed in either side of the aspheric lens $L_4$, and a convex surface of the aspheric lens $L_4$ faces the reduction side. The cemented lens portion has one negative lens $L_5$ and one positive lens $L_6$ cemented with each other. The positive lens portion is constituted by a cemented lens having one positive lens $L_7$ and one negative lens $L_8$ cemented with each other.

Due to the two cemented lenses provided in the third lens group $G_3$, chromatic aberration or the like can be improved.

Table 3 shows values of a curvature radius R of each lens surface of the projection lens according to Embodiment 2, an axial spacing D of each lens, a refractive index $N_d$ of each lens for a d-line, and an Abbe number $\nu_d$ of each lens for the d-line.

TABLE 3

| surface number | R | D | $N_d$ | $\nu_d$ |
|---|---|---|---|---|
| 1* | −4.6124 | 0.5923 | 1.49100 | 57.6 |
| 2* | −10.0362 | 1.6154 | | |
| 3 | −40.3969 | 0.2154 | 1.70565 | 35.2 |
| 4 | 2.1799 | 5.3452 | | |
| 5 | ∞ | 0.7853 | (mask) | |
| 6 | ∞ | 1.1532 | (stop) | |
| 7 | ∞ | 0.2154 | (mask) | |
| 8 | 3.2913 | 0.6958 | 1.84666 | 23.8 |
| 9 | −106.8393 | 1.1658 | | |
| 10* | −2.2285 | 0.2692 | 1.49100 | 57.6 |
| 11* | −1.9291 | 0.0217 | | |
| 12 | −4.0040 | 0.1077 | 1.80901 | 24.6 |
| 13 | 2.0027 | 0.8249 | 1.48749 | 70.4 |
| 14 | −3.1332 | 0.0215 | | |
| 15 | 2.8659 | 1.0048 | 1.49700 | 81.6 |
| 16 | −2.3678 | 0.1292 | 1.68167 | 31.3 |
| 17 | −4.6633 | 0.8615 | | |
| 18 | ∞ | 3.1513 | 1.51633 | 64.1 |
| 19 | ∞ | | | |

The mark * designates an aspheric surface.

Each aspheric surface is defined by the aforementioned aspheric surface expression. Table 4 shows values of constants K and $A_3$-$A_{15}$ corresponding to each aspheric surface.

Values corresponding to the conditional expressions (1) to (9) in Embodiment 2 are shown in Table 21 which will be described later. Thus, all the conditional expressions (1) to (9) are satisfied.

<Embodiment 3>

Figure 3:
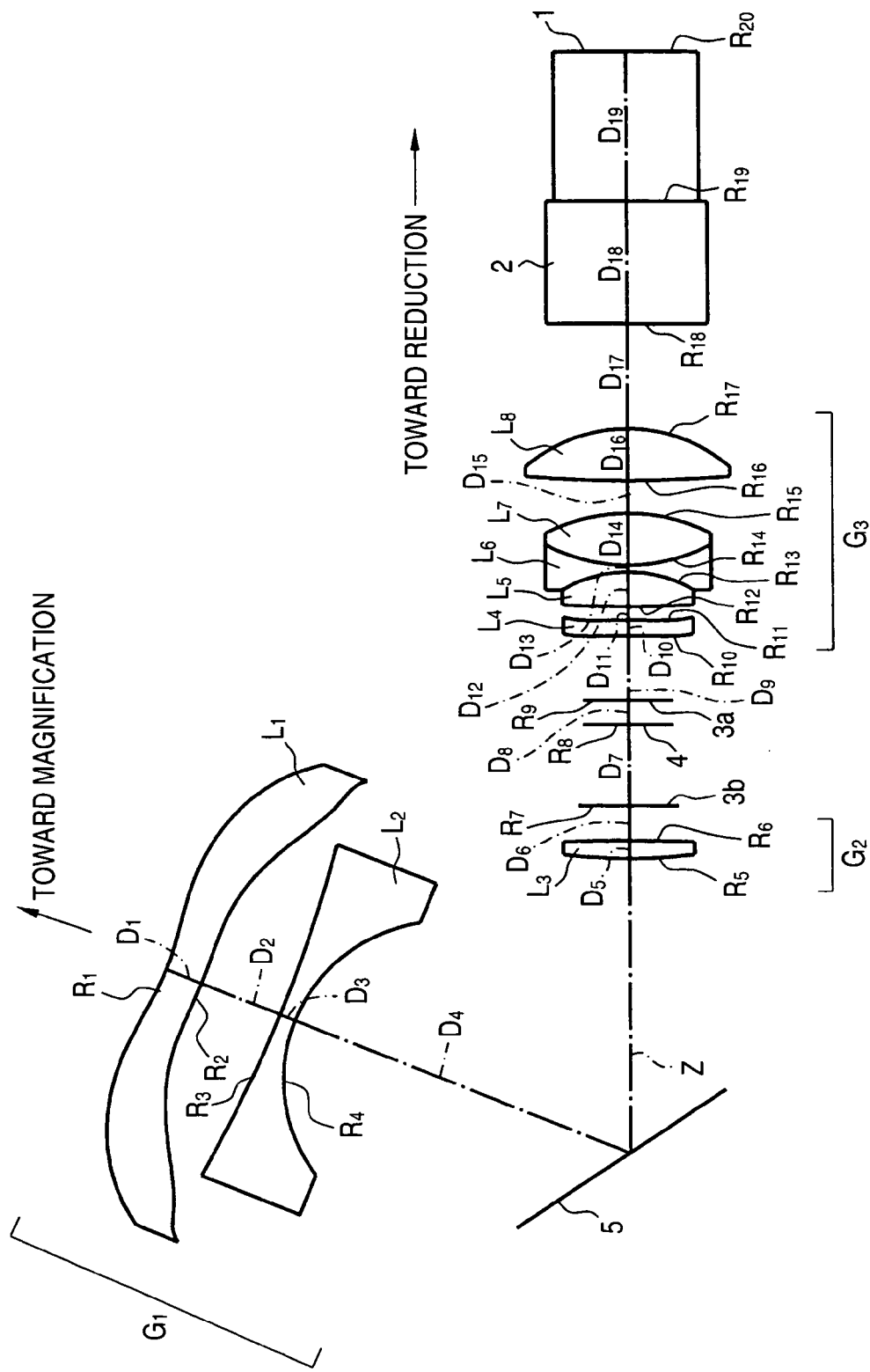
FIG. 3 is a diagram showing a projection lens of Embodiment 3 according to one aspect the invention.

A projection lens according to Embodiment 3 has a configuration as shown in FIG. 3.

As shown in FIG. 3, in the projection lens according to Embodiment 3, a first lens group $G_1$ having a negative refractive power, a mirror 5 serving as an optical path deflection unit, a second lens group $G_2$ having a positive refractive power, a mask 3b, an aperture stop 4, a mask 3a, and a third lens group $G_3$ having a positive refractive power are arrayed in this order from the magnification side. The reduction side of the projection lens is formed to be substantially telecentric. In this case, in order to form the telecentric configuration, the aperture stop 4 is placed substantially in agreement with the magnification-side focal position of the third lens group $G_3$.

The first lens group $G_1$ has a configuration substantially similar to that of the projection lens according to Embodiment 1.

The second lens group $G_2$ is constituted by one double-convex lens $L_3$.

The third lens group $G_3$ is constituted by five lenses as follows. That is, the third lens group $G_3$ has a single aspheric lens $L_4$, a positive cemented lens portion and a positive lens portion which are arrayed in this order from the magnification side. The aspheric lens $L_4$ has a low refractive power. An aspheric surface is formed in either side of the aspheric lens $L_4$. The positive cemented lens portion is constituted by a three-lens cemented lens where one negative lens $L_6$ is put between two positive lenses $L_5$ and $L_7$. The positive lens portion is constituted by a single positive lens $L_7$.

Since the positive cemented lens portion consisting of a three-lens cemented lens is provided in the third lens group $G_3$, the total system can be made compact while chromatic aberration (particularly high-order chromatic aberration) is corrected well.

Table 5 shows values of a curvature radius R of each lens surface of the projection lens according to Embodiment 3, an axial spacing D of each lens, a refractive index $N_d$ of each lens for a d-line, and an Abbe number $\nu_d$ of each lens for the d-line.

TABLE 4

| Surface number | K | $A_3$ | $A_4$ | $A_5$ | $A_6$ $A_7$ | $A_8$ TZ,1/57 | |
|---|---|---|---|---|---|---|---|
| 1 | −0.2527 | 2.8308 × $10^{-2}$ | 1.4583 × $10^{-2}$ | −6.4634 × $10^{-4}$ | −1.8399 × $10^{-3}$ | 2.4625 × $10^{-5}$ | 1.7016 × $10^{-4}$ |
| 2 | 0.7464 | 2.5741 × $10^{-2}$ | 1.2802 × $10^{-2}$ | 1.5704 × $10^{-4}$ | −1.3729 × $10^{-3}$ | −9.5267 × $10^{-5}$ | 4.9038 × $10^{-5}$ |
| 10 | 1.0000 | 0.0000 | −3.6841 × $10^{-2}$ | 2.5504 × $10^{-2}$ | −2.2122 × $10^{-2}$ | −2.7640 × $10^{-3}$ | 7.4822 × $10^{-3}$ |
| 11 | 1.0000 | 0.0000 | −5.2522 × $10^{-3}$ | −1.9401 × $10^{-2}$ | 1.9781 × $10^{-2}$ | −1.9728 × $10^{-3}$ | −6.4098 × $10^{-3}$ |

| surface number | $A_9$ | $A_{10}$ | $A_{11}$ | $A_{12}$ | $A_{13}$ | $A_{14}$ | $A_{15}$ |
|---|---|---|---|---|---|---|---|
| 1 | 8.5114 × $10^{-7}$ | −9.6796 × $10^{-6}$ | −4.2510 × $10^{-7}$ | 4.4194 × $10^{-7}$ | −1.3006 × $10^{-8}$ | −4.1218 × $10^{-10}$ | −6.2903 × $10^{-10}$ |
| 2 | 2.7249 × $10^{-6}$ | 4.4676 × $10^{-6}$ | 1.8967 × $10^{-6}$ | −1.0212 × $10^{-6}$ | −3.3047 × $10^{-9}$ | −3.8342 × $10^{-9}$ | 5.5853 × $10^{-9}$ |
| 10 | 5.0979 × $10^{-3}$ | −2.2360 × $10^{-3}$ | −1.2480 × $10^{-2}$ | 6.8003 × $10^{-4}$ | 0.0000 | 0.0000 | 0.0000 |
| 11 | −1.4096 × $10^{-3}$ | 4.4291 × $10^{-4}$ | −4.1144 × $10^{-3}$ | −3.2142 × $10^{-4}$ | 0.0000 | 0.0000 | 0.0000 |

TABLE 5

| surface number | R | D | $N_d$ | $v_d$ |
|---|---|---|---|---|
| 1* | −3.3381 | 0.6176 | 1.49100 | 57.6 |
| 2* | −6.4393 | 1.3709 | | |
| 3 | −23.8106 | 0.2583 | 1.63854 | 55.4 |
| 4 | 2.6183 | 10.6833 | | |
| 5 | 7.9882 | 0.2976 | 1.80518 | 25.4 |
| 6 | −32.0648 | 0.5750 | | |
| 7 | ∞ | 1.3475 | (mask) | |
| 8 | ∞ | 0.4047 | (stop) | |
| 9 | ∞ | 1.0668 | (mask) | |
| 10* | −11.5612 | 0.2583 | 1.49100 | 57.6 |
| 11* | −11.6823 | 0.2206 | | |
| 12 | 17.6272 | 0.5701 | 1.51633 | 64.1 |
| 13 | −2.0796 | 0.1123 | 1.83400 | 37.2 |
| 14 | 2.7989 | 0.8574 | 1.48749 | 70.2 |
| 15 | −2.9115 | 0.5508 | | |
| 16 | 19.0041 | 0.8615 | 1.48749 | 70.2 |
| 17 | −2.4887 | 1.7350 | | |
| 18 | ∞ | 2.0213 | 1.80518 | 25.4 |
| 19 | ∞ | 2.4705 | 1.61272 | 58.7 |
| 20 | ∞ | | | |

The mark * designates an aspheric surface.

Each aspheric surface is defined by the aforementioned aspheric surface expression. Table 6 shows values of constants K and $A_3$-$A_{15}$ corresponding to each aspheric surface.

TABLE 6

| Surface number | K | $A_3$ | $A_4$ | $A_5$ | $A_6$ | $A_7$ | $A_8$ |
|---|---|---|---|---|---|---|---|
| 1 | −0.7319 | $4.4217 \times 10^{-2}$ | $1.6343 \times 10^{-2}$ | $-2.4219 \times 10^{-3}$ | $-2.0964 \times 10^{-3}$ | $6.1676 \times 10^{-5}$ | $1.9917 \times 10^{-4}$ |
| 2 | 0.3404 | $4.1574 \times 10^{-2}$ | $1.7776 \times 10^{-2}$ | $-1.2588 \times 10^{-3}$ | $-1.6610 \times 10^{-3}$ | $-1.2156 \times 10^{-4}$ | $5.1895 \times 10^{-5}$ |
| 10 | 1.0000 | 0.0000 | $5.8879 \times 10^{-2}$ | 0.0000 | $1.0139 \times 10^{-2}$ | 0.0000 | $-6.0323 \times 10^{-3}$ |
| 11 | 1.0000 | 0.0000 | $7.2023 \times 10^{-2}$ | 0.0000 | $1.3717 \times 10^{-2}$ | 0.0000 | $-2.3093 \times 10^{-3}$ |

| surface number | $A_9$ | $A_{10}$ | $A_{11}$ | $A_{12}$ | $A_{13}$ | $A_{14}$ | $A_{15}$ |
|---|---|---|---|---|---|---|---|
| 1 | $4.2156 \times 10^{-6}$ | $-1.1048 \times 10^{-5}$ | $-9.5314 \times 10^{-7}$ | $5.4029 \times 10^{-7}$ | $-1.2984 \times 10^{-8}$ | $-4.1142 \times 10^{-10}$ | $-6.2779 \times 10^{-10}$ |
| 2 | $5.4903 \times 10^{-6}$ | $5.5479 \times 10^{-6}$ | $2.0401 \times 10^{-6}$ | $-1.1125 \times 10^{-6}$ | $-3.2990 \times 10^{-9}$ | $-3.8271 \times 10^{-9}$ | $5.5742 \times 10^{-9}$ |
| 10 | 0.0000 | $-6.5869 \times 10^{-4}$ | 0.0000 | 0.0000 | 0.0000 | 0.0000 | 0.0000 |
| 11 | 0.0000 | $-2.1867 \times 10^{-3}$ | 0.0000 | 0.0000 | 0.0000 | 0.0000 | 0.0000 |

Values corresponding to the conditional expressions (1)-(7) and (9) in Embodiment 3 are shown in Table 21 which will be described later. Thus, all the conditional expressions (1)-(7) and (9) are satisfied.

<Embodiment 4>

Figure 4:
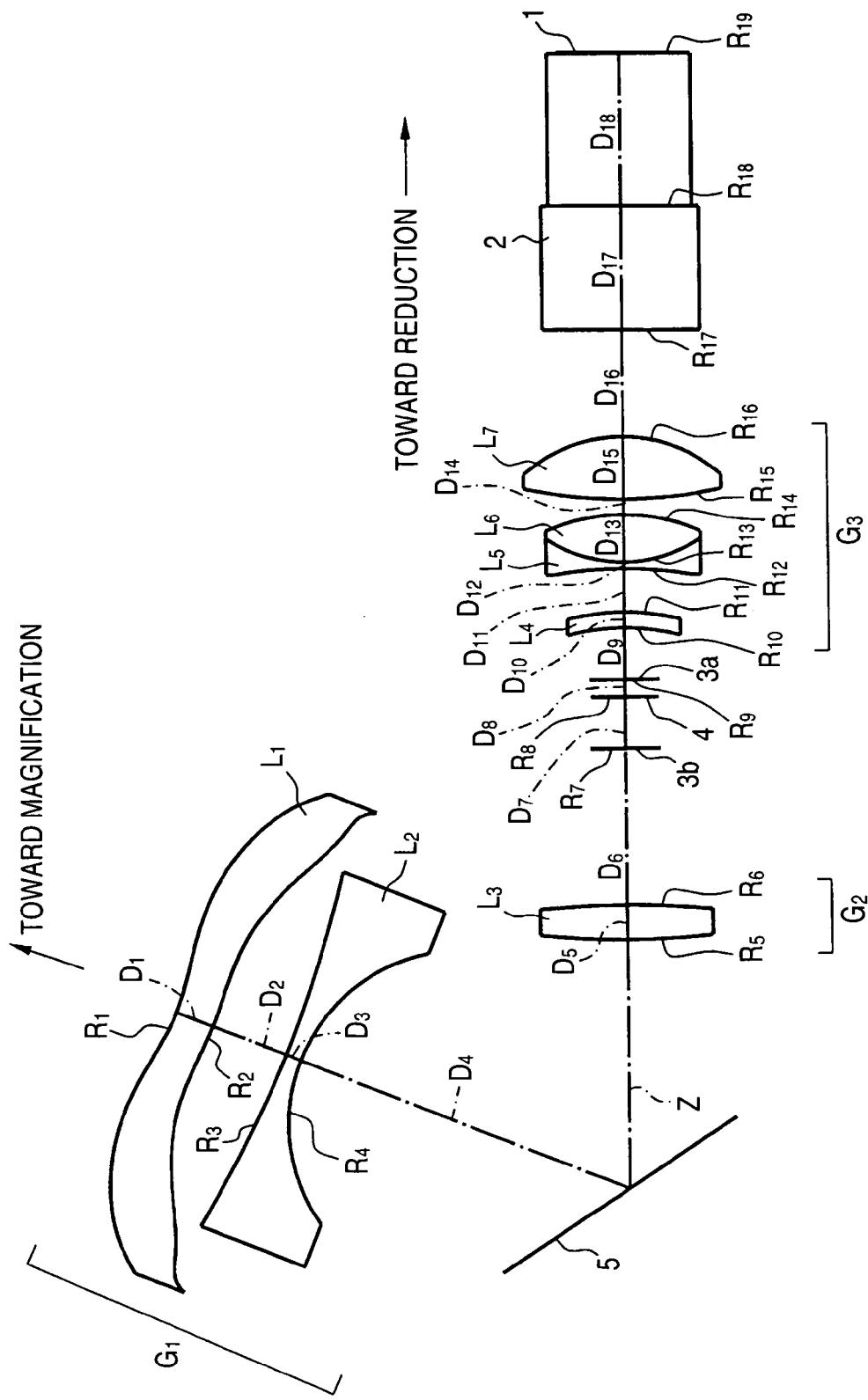
FIG. 4 is a diagram showing a projection lens of Embodiment 4 according to one aspect the invention.

A projection lens according to Embodiment 4 has a configuration similar to that of the projection lens according to Embodiment 3, as shown in FIG. 4. Parts the same as those of he projection lens according to Embodiment 3 will not be described.

The projection lens according to Embodiment 4 is different from the projection lens according to Embodiment 3 in the following points. That is, the third lens group $G_3$ is constituted by four lenses as follows. That is, the third lens group $G_3$ has a single aspheric lens $L_4$, a positive cemented lens portion and a positive lens portion which are arrayed in this order from the magnification side. The aspheric lens $L_4$ has a low refractive power. An aspheric surface is formed in either side of the aspheric lens $L_4$, and a convex surface of the aspheric lens $L_4$ faces the reduction side. The positive cemented lens portion has one negative lens $L_5$ and one positive lens $L_6$ cemented with each other. The positive lens portion is constituted by a single positive lens $L_7$.

Table 7 shows values of a curvature radius R of each lens surface of the projection lens according to Embodiment 4, an axial spacing D of each lens, a refractive index $N_d$ of each lens for a d-line, and an Abbe number $v_d$ of each lens for the d-line.

TABLE 7

| surface number | R | D | $N_d$ | $v_d$ |
|---|---|---|---|---|
| 1* | −3.0927 | 0.6176 | 1.49100 | 57.6 |
| 2* | −5.4464 | 1.2476 | | |
| 3 | −20.9547 | 0.2470 | 1.63854 | 55.4 |
| 4 | 2.8056 | 9.6616 | | |
| 5 | 12.2003 | 0.5709 | 1.75520 | 27.5 |
| 6 | −14.8426 | 2.5393 | | |
| 7 | ∞ | 0.8309 | (mask) | |
| 8 | ∞ | 0.2810 | (stop) | |
| 9 | ∞ | 0.8421 | (mask) | |
| 10* | −3.1135 | 0.2583 | 1.49100 | 57.6 |
| 11* | −2.9812 | 0.7030 | | |

TABLE 7-continued

| surface number | R | D | $N_d$ | $v_d$ |
|---|---|---|---|---|
| 12 | −6.1939 | 0.1123 | 1.83400 | 37.2 |
| 13 | 2.1486 | 0.7748 | 1.48749 | 70.2 |
| 14 | −2.9620 | 0.2503 | | |
| 15 | 7.1937 | 1.0167 | 1.48749 | 70.2 |
| 16 | −2.3176 | 1.7348 | | |
| 17 | ∞ | 2.0211 | 1.80518 | 25.4 |
| 18 | ∞ | 2.4702 | 1.61272 | 58.7 |
| 19 | ∞ | | | |

The mark * designates an aspheric surface.

Each aspheric surface is defined by the aforementioned aspheric surface expression. Table 8 shows values of constants K and $A_3$-$A_{15}$ corresponding to each aspheric surface.

TABLE 8

| Surface number | K | $A_3$ | $A_4$ | $A_5$ | $A_{6}$ | $A_7$ | $A_{8TZ,1/57}$ | |
|---|---|---|---|---|---|---|---|---|
| 1 | −0.7926 | $4.3683 \times 10^{-2}$ | $1.6018 \times 10^{-2}$ | $-2.2504 \times 10^{-3}$ | $-2.1589 \times 10^{-3}$ | $5.0027 \times 10^{-5}$ | $2.0005 \times 10^{-4}$ | |
| 2 | 0.1742 | $3.7823 \times 10^{-2}$ | $2.0299 \times 10^{-2}$ | $-1.8558 \times 10^{-3}$ | $-1.7396 \times 10^{-3}$ | $-1.2068 \times 10^{-4}$ | $5.6398 \times 10^{-5}$ | |
| 10 | 1.0000 | 0.0000 | $2.2242 \times 10^{-2}$ | 0.0000 | $-1.0243 \times 10^{-2}$ | 0.0000 | $2.1165 \times 10^{-2}$ | |
| 11 | 1.0000 | 0.0000 | $3.8495 \times 10^{-2}$ | 0.0000 | $-1.9280 \times 10^{-3}$ | 0.0000 | $1.1803 \times 10^{-2}$ | |

| surface number | $A_9$ | $A_{10}$ | $A_{11}$ | $A_{12}$ | $A_{13}$ | $A_{14}$ | $A_{15}$ |
|---|---|---|---|---|---|---|---|
| 1 | $5.2065 \times 10^{-6}$ | $-1.0894 \times 10^{-5}$ | $-9.8254 \times 10^{-7}$ | $5.3285 \times 10^{-7}$ | $-1.3001 \times 10^{-8}$ | $-4.1201 \times 10^{-10}$ | $-6.2875 \times 10^{-10}$ |
| 2 | $7.1433 \times 10^{-6}$ | $6.0355 \times 10^{-6}$ | $2.0806 \times 10^{-6}$ | $-1.1649 \times 10^{-6}$ | $-3.3034 \times 10^{-9}$ | $-3.8326 \times 10^{-9}$ | $5.5828 \times 10^{-9}$ |
| 10 | 0.0000 | $-2.3371 \times 10^{-2}$ | 0.0000 | 0.0000 | 0.0000 | 0.0000 | 0.0000 |
| 11 | 0.0000 | $-1.5257 \times 10^{-2}$ | 0.0000 | 0.0000 | 0.0000 | 0.0000 | 0.0000 |

Values corresponding to the conditional expressions (1)-(7) and (9) in Embodiment 4 are shown in Table 21 which will be described later. Thus, all the conditional expressions (1)-(7) and (9) are satisfied.

<Embodiment 5>

Figure 5:
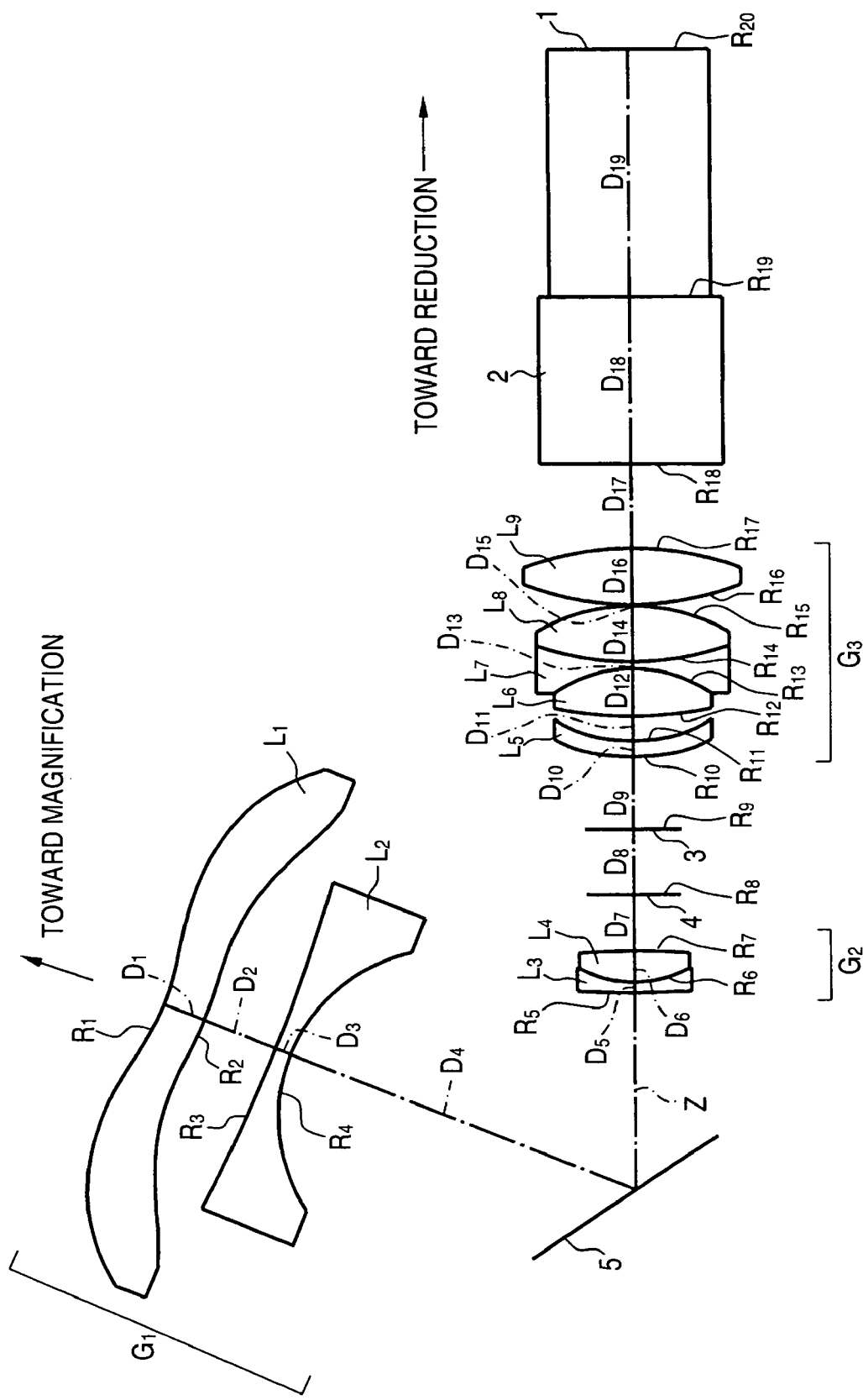
FIG. 5 is a diagram showing a projection lens of Embodiment 5 according to one aspect the invention.

A projection lens according to Embodiment 5 has a configuration similar to that of the projection lens according to Embodiment 3, as shown in FIG. 5. Parts the same as those of the projection lens according to Embodiment 3 will not be described.

The projection lens according to Embodiment 5 is different from the projection lens according to Embodiment 3 in the following points. That is, the second lens group $G_2$ is constituted by a positive cemented lens having one negative lens $L_3$ and one positive lens $L_4$ cemented with each other. Further, the third lens group $G_3$ is constituted by a single aspheric lens $L_5$, a positive cemented lens portion and a positive lens portion arrayed in this order from the magnification side. The aspheric lens $L_5$ has a low refractive power. An aspheric surface is formed in either side of the aspheric lens $L_5$, and a convex surface of the aspheric lens $L_5$ faces the magnification side. The positive cemented lens portion is constituted by a three-lens cemented lens where one negative lens $L_7$ is put between two positive lenses $L_6$ and $L_8$. The positive lens portion is constituted by a single positive lens $L_9$. In addition, only one mask 3 is provided.

Table 9 shows values of a curvature radius R of each lens surface of the projection lens according to Embodiment 5, an axial spacing D of each lens, a refractive index $N_d$ of each lens for a d-line, and an Abbe number $v_d$ of each lens for the d-line.

TABLE 9

| surface number | R | D | $N_d$ | $v_d$ |
|---|---|---|---|---|
| 1* | −2.9723 | 0.6777 | 1.49100 | 57.6 |
| 2* | −5.2814 | 1.2340 | | |
| 3 | −29.2016 | 0.2598 | 1.65844 | 50.9 |
| 4 | 2.7460 | 9.1027 | | |
| 5 | 16.8966 | 0.1694 | 1.83400 | 37.2 |
| 6 | 1.7975 | 0.4998 | 1.75520 | 27.5 |
| 7 | −14.3854 | 0.9161 | | |
| 8 | ∞ | 1.0608 | (stop) | |
| 9 | ∞ | 1.1859 | (mask) | |
| 10* | 4.2724 | 0.2598 | 1.49100 | 57.6 |
| 11* | 3.1435 | 0.3933 | | |
| 12 | 5.8440 | 0.7739 | 1.48749 | 70.2 |
| 13 | −2.1555 | 0.1130 | 1.83400 | 37.2 |
| 14 | 4.5340 | 0.9016 | 1.48749 | 70.2 |
| 15 | −2.9775 | 0.0226 | | |
| 16 | 4.6004 | 0.9129 | 1.48749 | 70.2 |
| 17 | −4.8918 | 1.3802 | | |
| 18 | ∞ | 2.7107 | 1.80518 | 25.4 |
| 19 | ∞ | 4.0164 | 1.61272 | 58.7 |
| 20 | ∞ | | | |

The mark * designates an aspheric surface.

Each aspheric surface is defined by the aforementioned aspheric surface expression. Table 10 shows values of constants K and $A_3$-$A_{15}$ corresponding to each aspheric surface.

TABLE 10

| Surface number | K | $A_3$ | $A_4$ | $A_5$ | $A_{6}$ | $A_7$ | $A_{8TZ,1/57}$ | |
|---|---|---|---|---|---|---|---|---|
| 1 | −0.7782 | $3.0160 \times 10^{-2}$ | $1.9561 \times 10^{-2}$ | $-1.9329 \times 10^{-3}$ | $-2.2660 \times 10^{-3}$ | $3.3613 \times 10^{-5}$ | $1.9467 \times 10^{-4}$ | |
| 2 | −2.0178 | $2.0419 \times 10^{-2}$ | $2.2878 \times 10^{-2}$ | $-1.3898 \times 10^{-3}$ | $-1.8062 \times 10^{-3}$ | $-1.4794 \times 10^{-4}$ | $5.1414 \times 10^{-5}$ | |
| 10 | 1.0000 | 0.0000 | $4.7729 \times 10^{-2}$ | 0.0000 | $-7.2650 \times 10^{-3}$ | 0.0000 | $3.3356 \times 10^{-3}$ | |
| 11 | 1.0000 | 0.0000 | $4.5265 \times 10^{-2}$ | 0.0000 | $-5.2701 \times 10^{-3}$ | 0.0000 | $1.4584 \times 10^{-4}$ | |

| surface number | $A_9$ | $A_{10}$ | $A_{11}$ | $A_{12}$ | $A_{13}$ | $A_{14}$ | $A_{15}$ |
|---|---|---|---|---|---|---|---|
| 1 | $5.5430 \times 10^{-6}$ | $-1.0251 \times 10^{-5}$ | $-8.9840 \times 10^{-7}$ | $4.8637 \times 10^{-7}$ | $-1.2113 \times 10^{-8}$ | $-3.8161 \times 10^{-10}$ | $-5.7893 \times 10^{-10}$ |
| 2 | $8.0953 \times 10^{-6}$ | $6.5633 \times 10^{-6}$ | $2.1342 \times 10^{-6}$ | $-1.1660 \times 10^{-6}$ | $-3.0777 \times 10^{-9}$ | $-3.5498 \times 10^{-9}$ | $5.1405 \times 10^{-9}$ |
| 10 | 0.0000 | $1.5784 \times 10^{-3}$ | 0.0000 | $-9.7929 \times 10^{-4}$ | 0.0000 | 0.0000 | 0.0000 |
| 11 | 0.0000 | $4.3128 \times 10^{-3}$ | 0.0000 | $-1.6263 \times 10^{-3}$ | 0.0000 | 0.0000 | 0.0000 |

Values corresponding to the conditional expressions (1)-(7) and (9) in Embodiment 5 are shown in Table 21 which will be described later. Thus, all the conditional expressions (1)-(7) and (9) are satisfied.

<Embodiment 6>

Figure 6:
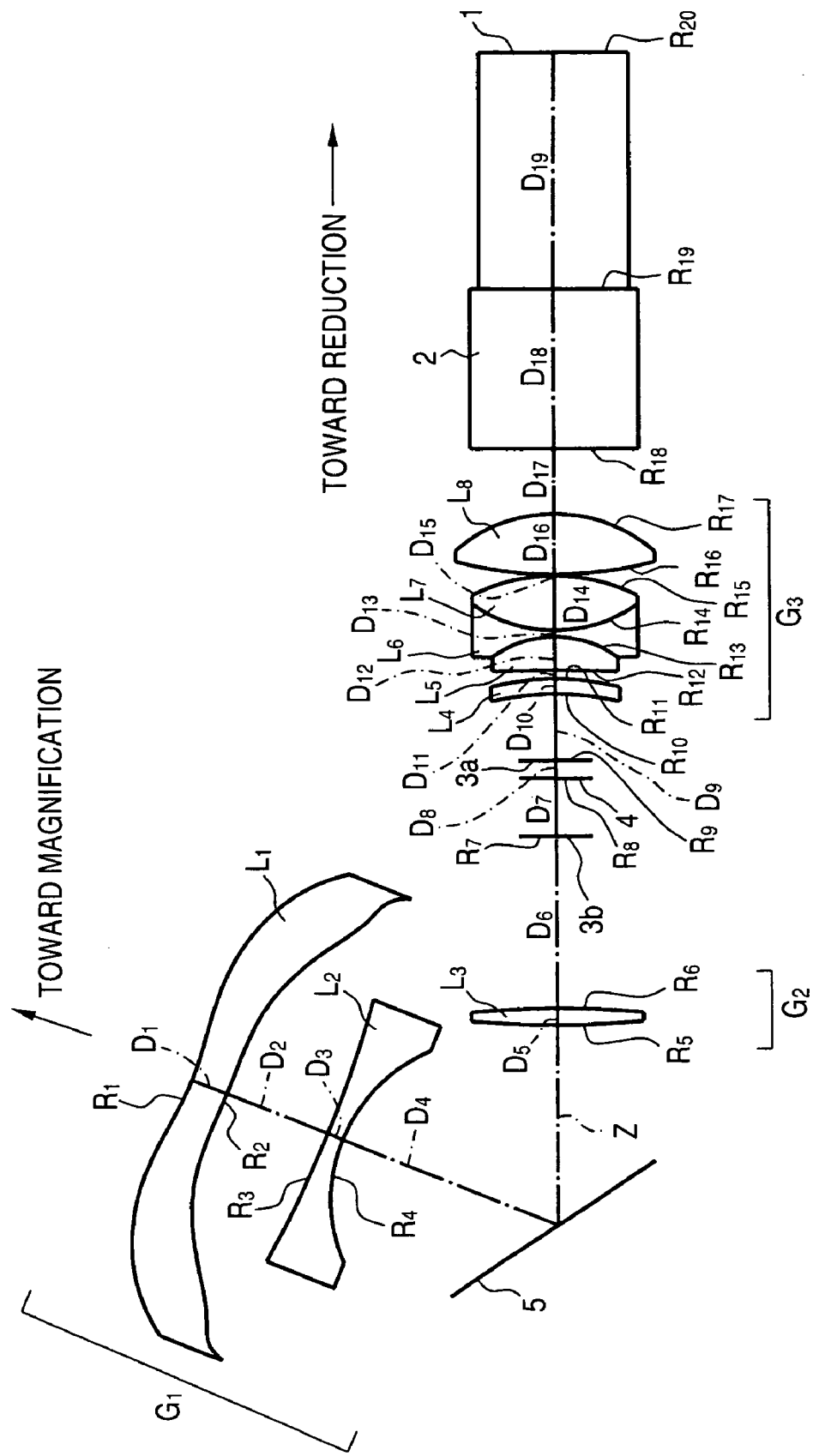
FIG. 6 is a diagram showing a projection lens of Embodiment 6 according to one aspect the invention.

A projection lens according to Embodiment 6 is designed as shown in FIG. 6. The projection lens according to Embodiment 6 has a configuration substantially similar to that of the projection lens according to Embodiment 3.

Table 11 shows values of a curvature radius R of each lens surface of the projection lens according to Embodiment 6, an axial spacing D of each lens, a refractive index $N_d$ of each lens for a d-line, and an Abbe number $v_d$ of each lens for the d-line.

TABLE 11

| surface number | R | D | $N_d$ | $v_d$ |
|---|---|---|---|---|
| 1* | −4.1670 | 0.6188 | 1.49100 | 57.6 |
| 2* | −12.0767 | 1.8009 | | |
| 3 | −20.4515 | 0.2588 | 1.78590 | 44.2 |
| 4 | 2.7509 | 7.2527 | | |
| 5 | 14.5745 | 0.2914 | 1.84666 | 23.8 |
| 6 | −14.6256 | 2.9205 | | |
| 7 | ∞ | 0.9788 | (mask) | |
| 8 | ∞ | 0.3049 | (stop) | |
| 9 | ∞ | 1.1251 | (mask) | |
| 10* | −3.7539 | 0.2588 | 1.51007 | 56.2 |
| 11* | −3.3613 | 0.1398 | | |
| 12 | −26.8625 | 0.5693 | 1.51823 | 59.0 |
| 13 | −1.7308 | 0.1125 | 1.79952 | 42.2 |
| 14 | 2.3438 | 0.9314 | 1.48749 | 70.2 |
| 15 | −3.0025 | 0.0225 | | |
| 16 | 6.4627 | 1.0341 | 1.48749 | 70.2 |
| 17 | −2.4819 | 1.1172 | | |
| 18 | ∞ | 2.7001 | 1.80518 | 25.5 |
| 19 | ∞ | 4.0007 | 1.61272 | 58.6 |
| 20 | ∞ | | | |

The mark * designates an aspheric surface.

Each aspheric surface is defined by the aforementioned aspheric surface expression. Table 12 shows values of constants K and $A_3$-$A_{15}$ corresponding to each aspheric surface.

Values corresponding to the conditional expressions (1)-(7) and (9) in Embodiment 6 are shown in Table 21 which will be described later. Thus, all the conditional expressions (1)-(7) and (9) are satisfied.

<Embodiment 7>

Figure 7:
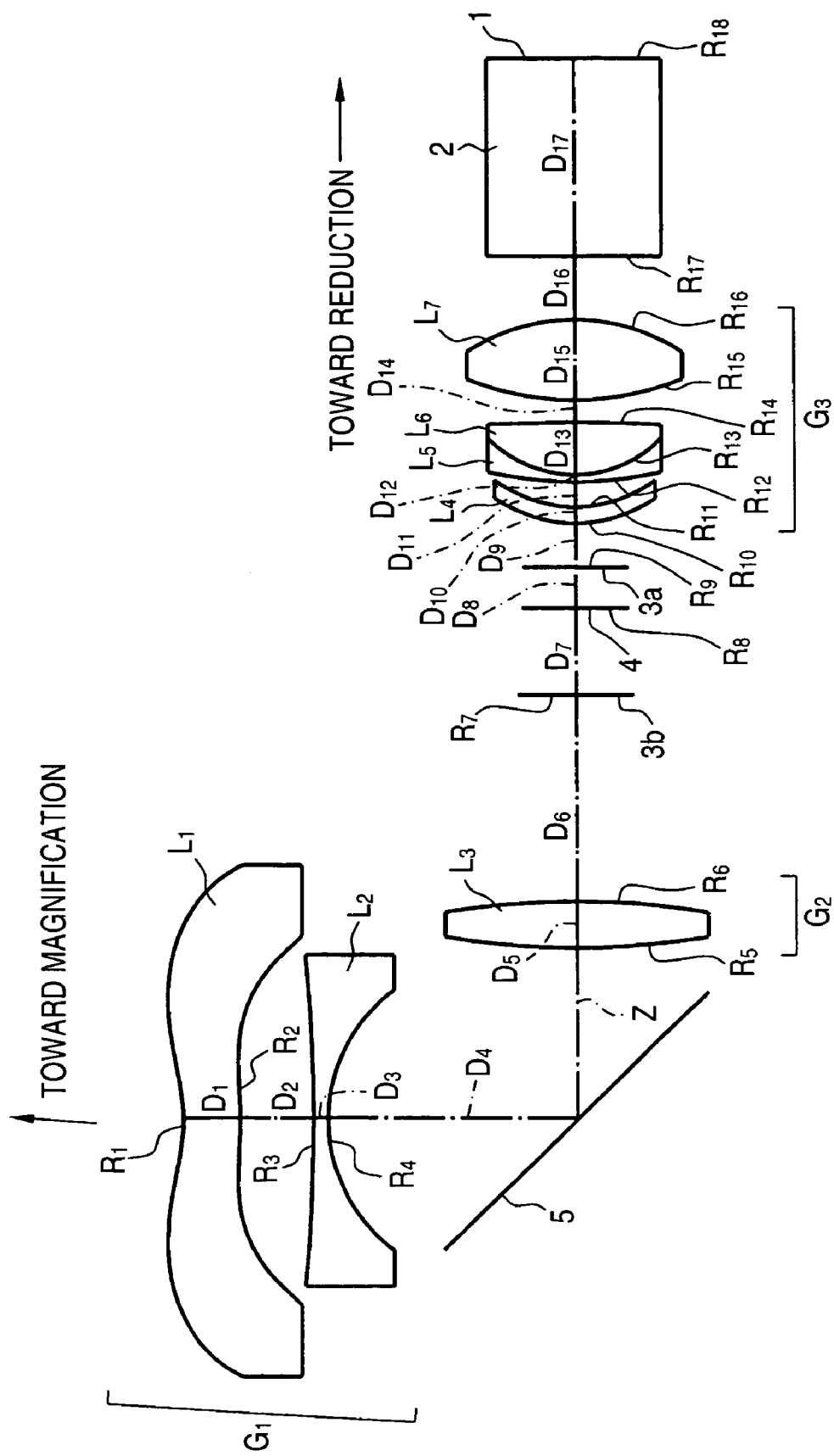
FIG. 7 is a diagram showing a projection lens of Embodiment 7 according to one aspect the invention.

A projection lens according to Embodiment 7 is designed as shown in FIG. 7. The projection lens according to Embodiment 7 has a configuration substantially similar to that of the projection lens according to Embodiment 4.

However, the projection lens according to Embodiment 7 is different from the projection lens according to Embodiment 4 in the point that the aspheric lens $L_4$ located the most closely to the magnification side in the third lens group $G_3$ has a convex surface facing the magnification side.

Table 13 shows values of a curvature radius R of each lens surface of the projection lens according to Embodiment 7, an axial spacing D of each lens, a refractive index $N_d$ of each lens for a d-line, and an Abbe number $v_d$ of each lens for the d-line.

TABLE 13

| surface number | R | D | $N_d$ | $v_d$ |
|---|---|---|---|---|
| 1* | −2.1549 | 0.8470 | 1.49100 | 57.6 |
| 2* | −4.4133 | 1.0947 | | |
| 3 | −26.1233 | 0.2149 | 1.67790 | 55.3 |
| 4 | 2.4386 | 6.2302 | | |
| 5 | 11.0429 | 0.7016 | 1.80400 | 46.6 |
| 6 | −11.6080 | 3.1052 | | |
| 7 | ∞ | 1.3065 | (mask) | |
| 8 | ∞ | 0.6211 | (stop) | |
| 9 | ∞ | 0.6584 | (mask) | |
| 10* | 1.9109 | 0.2484 | 1.49100 | 57.6 |
| 11* | 1.8540 | 0.3765 | | |
| 12 | 5.5221 | 0.1074 | 1.80610 | 33.3 |
| 13 | 1.7494 | 0.7829 | 1.48749 | 70.2 |
| 14 | −28.5040 | 0.3422 | | |
| 15 | 4.0854 | 1.2081 | 1.49700 | 81.6 |
| 16 | −2.8259 | 0.9564 | | |
| 17 | ∞ | 2.9686 | 1.51633 | 64.1 |
| 18 | ∞ | | | |

The mark * designates an aspheric surface.

TABLE 12

| Surface number | K | $A_3$ | $A_4$ | $A_5$ | $A_6$ | $A_7$ | $A_8$ |
|---|---|---|---|---|---|---|---|
| 1 | −1.0328 | $2.1299 \times 10^{-2}$ | $1.9510 \times 10^{-2}$ | $-1.2446 \times 10^{-3}$ | $-2.2210 \times 10^{-3}$ | $6.9105 \times 10^{-6}$ | $1.9420 \times 10^{-4}$ |
| 2 | −11.1519 | $1.3757 \times 10^{-2}$ | $2.2351 \times 10^{-2}$ | $-9.1357 \times 10^{-4}$ | $-1.6875 \times 10^{-3}$ | $-1.3116 \times 10^{-4}$ | $5.0747 \times 10^{-5}$ |
| 10 | 1.0000 | 0.0000 | $2.1451 \times 10^{-2}$ | 0.0000 | $8.5464 \times 10^{-3}$ | 0.0000 | $-1.9140 \times 10^{-2}$ |
| 11 | 1.0000 | 0.0000 | $2.6923 \times 10^{-2}$ | 0.0000 | $1.4408 \times 10^{-2}$ | 0.0000 | $-2.0823 \times 10^{-2}$ |

| surface number | $A_9$ | $A_{10}$ | $A_{11}$ | $A_{12}$ | $A_{13}$ | $A_{14}$ | $A_{15}$ |
|---|---|---|---|---|---|---|---|
| 1 | $5.7827 \times 10^{-6}$ | $-1.0408 \times 10^{-5}$ | $-9.0964 \times 10^{-7}$ | $5.0373 \times 10^{-7}$ | $-1.2695 \times 10^{-8}$ | $-4.0152 \times 10^{-10}$ | $-6.1154 \times 10^{-10}$ |
| 2 | $5.7035 \times 10^{-6}$ | $5.5741 \times 10^{-6}$ | $2.0172 \times 10^{-6}$ | $-1.1054 \times 10^{-6}$ | $-3.2257 \times 10^{-9}$ | $-3.7350 \times 10^{-9}$ | $5.4300 \times 10^{-9}$ |
| 10 | 0.0000 | $1.0442 \times 10^{-2}$ | 0.0000 | 0.0000 | 0.0000 | 0.0000 | 0.0000 |
| 11 | 0.0000 | $7.7238 \times 10^{-3}$ | 0.0000 | 0.0000 | 0.0000 | 0.0000 | 0.0000 |

Each aspheric surface is defined by the aforementioned aspheric surface expression. Table 14 shows values of constants K and $A_3$-$A_{15}$ corresponding to each aspheric surface.

TABLE 14

| Surface number | K | $A_3$ | $A_4$ | $A_5$ | $A_6$ | $A_7$ | $A_8$ |
|---|---|---|---|---|---|---|---|
| 1 | −0.0740 | 9.6886 × 10⁻² | −4.1778 × 10⁻³ | 2.5627 × 10⁻³ | −1.5860 × 10⁻³ | −1.7340 × 10⁻⁴ | 8.6412 × 10⁻⁵ |
| 2 | 0.5776 | 8.5412 × 10⁻² | −1.3977 × 10⁻³ | −1.3961 × 10⁻³ | 5.1023 × 10⁻³ | −2.2879 × 10⁻⁴ | −8.4912 × 10⁻⁴ |
| 10 | 1.0000 | 5.3583 × 10⁻³ | −5.0042 × 10⁻⁴ | −6.3243 × 10⁻² | 2.0726 × 10⁻¹ | −3.2285 × 10⁻¹ | 1.7207 × 10⁻¹ |
| 11 | 1.0000 | 2.0620 × 10⁻³ | −2.0907 × 10⁻² | 1.7092 × 10⁻¹ | −4.2399 × 10⁻¹ | 3.9867 × 10⁻¹ | −4.4104 × 10⁻² |

| surface number | $A_9$ | $A_{10}$ | $A_{11}$ | $A_{12}$ | $A_{13}$ | $A_{14}$ | $A_{15}$ |
|---|---|---|---|---|---|---|---|
| 1 | 6.5876 × 10⁻⁶ | 4.5323 × 10⁻⁶ | −1.6107 × 10⁻⁶ | 2.4838 × 10⁻⁷ | −1.5130 × 10⁻⁷ | 2.5948 × 10⁻⁸ | 0.0000 |
| 2 | −1.8917 × 10⁻⁴ | 6.5371 × 10⁻⁶ | 5.7130 × 10⁻⁵ | 2.1605 × 10⁻⁶ | 1.5269 × 10⁻⁶ | −1.6619 × 10⁻⁶ | 0.0000 |
| 10 | 3.7605 × 10⁻² | 2.5813 × 10⁻³ | −1.0744 × 10⁻¹ | 5.7292 × 10⁻² | 0.0000 | 0.0000 | 0.0000 |
| 11 | −6.7401 × 10⁻² | −1.8780 × 10⁻¹ | 2.3043 × 10⁻¹ | −6.4771 × 10⁻² | 0.0000 | 0.0000 | 0.0000 |

Values corresponding to the conditional expressions (1)-(7) and (9) in Embodiment 7 are shown Table 21 which will be described later. Thus, all the conditional expressions (1)-(7) and (9) are satisfied.

<Embodiment 8>

Figure 8:
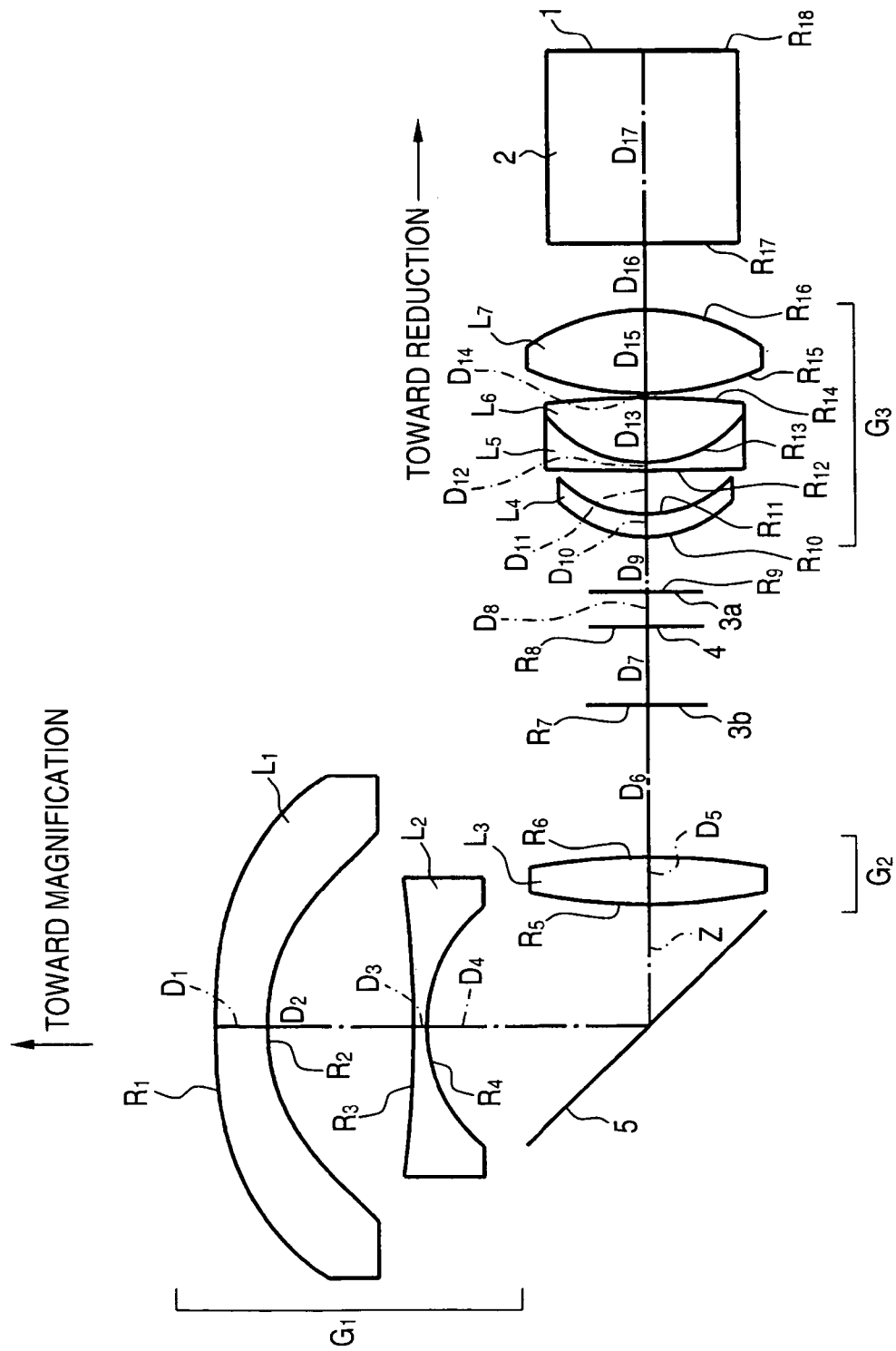
FIG. 8 is a diagram showing a projection lens of Embodiment 8 according to one aspect the invention.

A projection lens according to Embodiment 8 is designed as shown in FIG. 8. The projection lens according to Embodiment 8 has a configuration substantially similar to that of the projection lens according to Embodiment 7.

Table 15 shows values of a curvature radius R of each lens surface of the projection lens according to Embodiment 8, an axial spacing D of each lens, a refractive index $N_d$ of each lens for a d-line, and an Abbe number $v_d$ of each lens for the d-line.

TABLE 15

| surface number | R | D | $N_d$ | $v_d$ |
|---|---|---|---|---|
| 1* | 19.7739 | 0.6104 | 1.49100 | 57.6 |
| 2* | 3.3759 | 1.7201 | | |
| 3 | −13.8388 | 0.1554 | 1.62041 | 60.3 |
| 4 | 1.8475 | 4.1127 | | |
| 5 | 6.5722 | 0.5732 | 1.74320 | 49.3 |
| 6 | −8.2096 | 1.8311 | | |
| 7 | ∞ | 0.9480 | (mask) | |
| 8 | ∞ | 0.4217 | (stop) | |
| 9 | ∞ | 0.6765 | (mask) | |
| 10* | 1.4413 | 0.2775 | 1.49100 | 57.6 |
| 11* | 1.5308 | 0.5234 | | |
| 12 | 39.6744 | 0.0999 | 1.80610 | 33.3 |
| 13 | 1.4611 | 0.7807 | 1.58913 | 61.2 |
| 14 | −10.7380 | 0.0555 | | |
| 15 | 3.4209 | 1.0082 | 1.51633 | 64.1 |
| 16 | −2.4087 | 0.8124 | | |
| 17 | ∞ | 2.3194 | 1.51633 | 64.1 |
| 18 | ∞ | | | |

The mark * designates an aspheric surface.

Each aspheric surface is defined by the aforementioned aspheric surface expression. Table 16 shows values of constants K and $A_3$-$A_{15}$ corresponding to each aspheric surface.

TABLE 16

| Surface number | K | $A_3$ | $A_4$ | $A_5$ | $A_6$ | $A_7$ | $A_8$ |
|---|---|---|---|---|---|---|---|
| 1 | −0.0740 | 3.4390 × 10⁻² | 8.4644 × 10⁻³ | −1.3923 × 10⁻³ | −3.0186 × 10⁻³ | 4.5837 × 10⁻⁴ | 3.8366 × 10⁻⁴ |
| 2 | 0.5776 | 4.7686 × 10⁻² | 6.3149 × 10⁻³ | −1.8709 × 10⁻³ | −2.0364 × 10⁻³ | −4.5283 × 10⁻⁵ | 1.7039 × 10⁻⁴ |
| 10 | 1.0000 | 0.0000 | 8.8685 × 10⁻² | −2.0505 × 10⁻¹ | 3.4835 × 10⁻¹ | −2.7262 × 10⁻¹ | 2.4520 × 10⁻² |
| 11 | 1.0000 | 0.0000 | 9.2105 × 10⁻² | 5.5769 × 10⁻² | −2.9197 × 10⁻¹ | 4.2901 × 10⁻¹ | −1.6764 × 10⁻¹ |

| surface number | $A_9$ | $A_{10}$ | $A_{11}$ | $A_{12}$ | $A_{13}$ | $A_{14}$ | $A_{15}$ |
|---|---|---|---|---|---|---|---|
| 1 | −8.3457 × 10⁻⁶ | −3.5247 × 10⁻⁵ | −3.3000 × 10⁻⁶ | 2.6570 × 10⁻⁶ | −5.1782 × 10⁻⁸ | −1.8413 × 10⁻⁹ | −3.1530 × 10⁻⁹ |
| 2 | 2.0729 × 10⁻⁵ | 1.5560 × 10⁻⁵ | 6.2209 × 10⁻⁶ | −9.5622 × 10⁻⁶ | −1.3157 × 10⁻⁸ | −1.7128 × 10⁻⁸ | 2.7996 × 10⁻⁸ |
| 10 | 2.5554 × 10⁻² | −5.7864 × 10⁻³ | 3.6950 × 10⁻³ | 3.3163 × 10⁻³ | 0.0000 | 0.0000 | 0.0000 |
| 11 | −1.4366 × 10⁻¹ | −6.9608 × 10⁻³ | 8.2864 × 10⁻² | 1.3655 × 10⁻³ | 0.0000 | 0.0000 | 0.0000 |

Values corresponding to the conditional expressions (1)-(7) and (9) in Embodiment 8 are shown in Table 21 which will be described later. Thus, all the conditional expressions (1)-(7) and (9) are satisfied.

<Embodiment 9>

Figure 9:
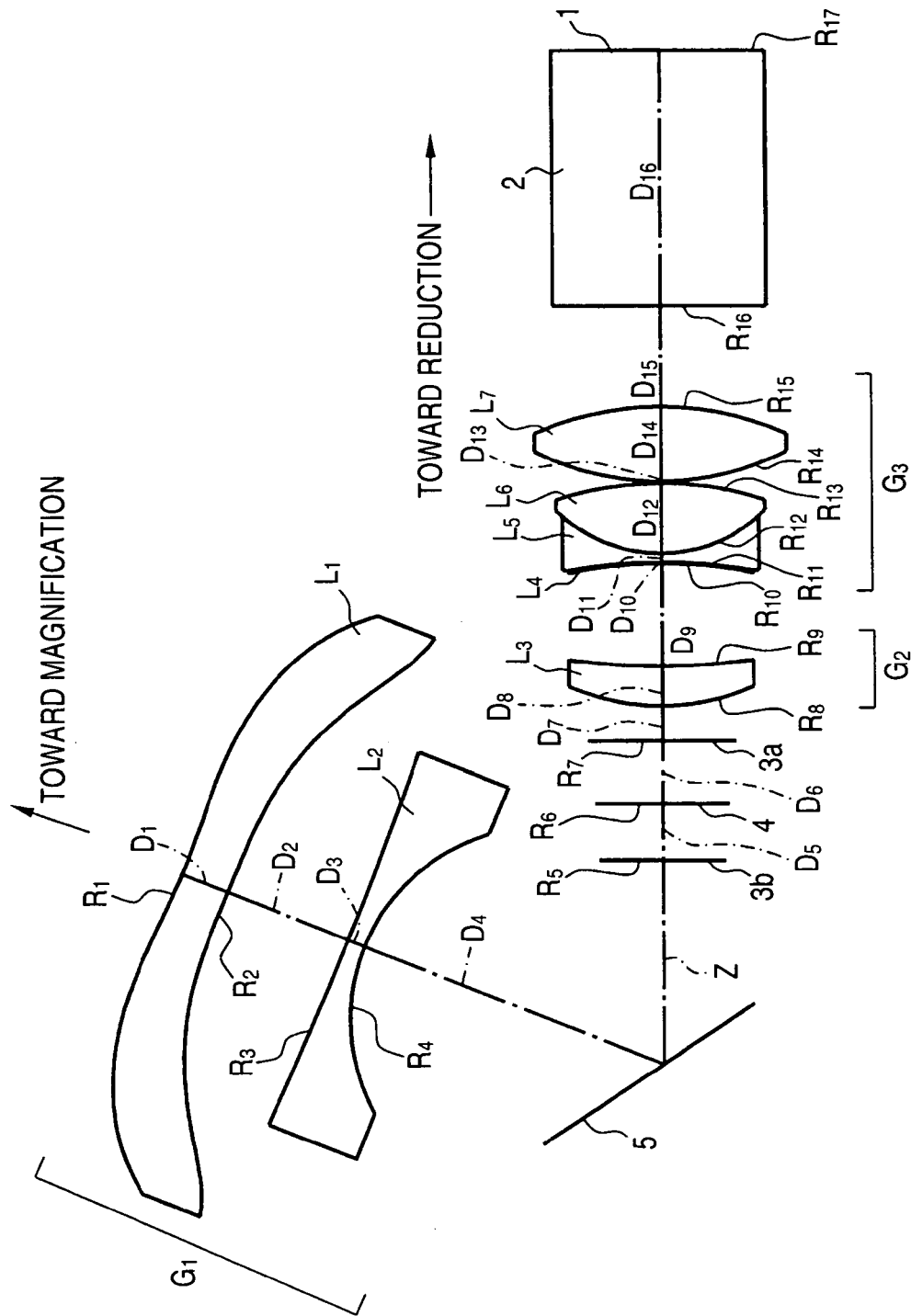
FIG. 9 is a diagram showing a projection lens of Embodiment 9 according to one aspect the invention.

A projection lens according to Embodiment 9 has a configuration partially the same as that of the projection lens according to Embodiment 1, as shown in FIG. 9. Parts the same as those of the projection lens according to Embodiment 1 will not be described.

The projection lens according to Embodiment 9 is different from the projection lens according to Embodiment 1 in the following points. That is, the third lens group $G_3$ is constituted by three lenses as follows. That is, the third lens group $G_3$ has a positive cemented lens portion and a positive lens portion which are arrayed in this order from the magnification side. The positive cemented lens portion has one negative lens $L_5$ and one positive lens $L_6$ cemented with each other. The positive lens portion is constituted by a single positive lens $L_7$. A thin resin layer $L_4$ is additionally provided on the magnification side surface of the cemented lens portion. An aspheric surface is formed in the resin layer $L_4$.

Due to the aspheric surface formed thus on the magnification side surface of the cemented lens portion by use of the thin resin layer $L_4$, the lens system can be made compact, and the cost can be reduced.

Table 17 shows values of a curvature radius R of each lens surface of the projection lens according to Embodiment 9, an axial spacing D of each lens, a refractive index $N_d$ of each lens for a d-line, and an Abbe number $v_d$ of each lens for the d-line.

TABLE 17

| surface number | R | D | $N_d$ | $v_d$ |
|---|---|---|---|---|
| 1* | −7.2243 | 0.5922 | 1.49100 | 57.6 |
| 2* | −119.2278 | 1.5779 | | |
| 3 | −50.9275 | 0.2153 | 1.65844 | 50.8 |
| 4 | 2.4096 | 6.3946 | | |
| 5 | ∞ | 0.6912 | (mask) | |
| 6 | ∞ | 0.7623 | (stop) | |
| 7 | ∞ | 0.4307 | (mask) | |
| 8 | 2.6897 | 0.4923 | 1.84666 | 23.8 |
| 9 | 8.1018 | 1.2627 | | |
| 10* | −6.6935 | 0.0161 | 1.52771 | 41.8 |
| 11 | −6.4788 | 0.1077 | 1.80518 | 25.5 |
| 12 | 1.7652 | 0.8723 | 1.49700 | 81.6 |
| 13 | −3.9936 | 0.0215 | | |
| 14 | 3.2890 | 0.9317 | 1.49700 | 81.6 |
| 15 | −3.6936 | 1.2403 | | |
| 16 | ∞ | 3.1505 | 1.51633 | 64.1 |
| 17 | ∞ | | | |

The mark * designates an aspheric surface.

Each aspheric surface is defined by the aforementioned aspheric surface expression. Table 18 shows values of constants K and $A_3$-$A_{15}$ corresponding to each aspheric surface.

Values corresponding to the conditional expressions (1)-(8) in Embodiment 9 are shown in Table 21 which will be described later. Thus, all the conditional expressions (1)-(8) are satisfied.

<Embodiment 10>

Figure 10:
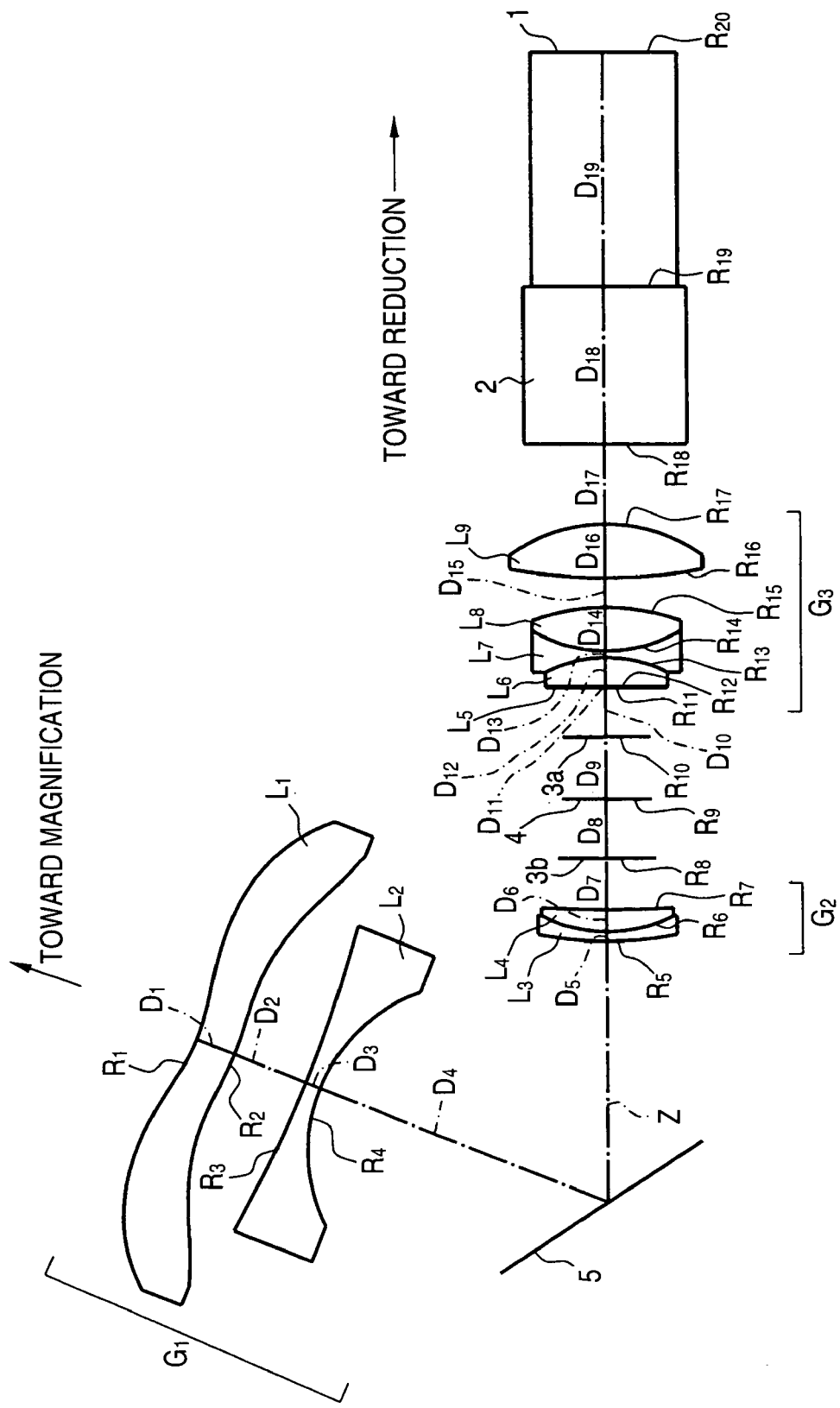
FIG. 10 is a diagram showing a projection lens of Embodiment 10 according to one aspect the invention.

A projection lens according to Embodiment 10 has a configuration partially the same as that of the projection lens according to Embodiment 5, as shown in FIG. 10. Parts the same as those of the projection lens according to Embodiment 5 will not be described.

The projection lens according to Embodiment 10 is different from the projection lens according to Embodiment 5 in the following points. That is, the third lens group $G_3$ is constituted by four lenses as follows. That is, the third lens group $G_3$ has a positive cemented lens portion and a positive lens portion which are arrayed in this order from the magnification side. The positive cemented lens portion is constituted by a three-lens cemented lens where one negative lens $L_7$ is put between two positive lenses $L_6$ and $L_8$. The positive lens portion is constituted by a single positive lens $L_9$. A thin resin layer $L_5$ is additionally provided on the magnification side surface of the cemented lens portion. An aspheric surface is formed in the resin layer $L_5$.

Due to the aspheric surface formed thus on the magnification side surface of the cemented lens portion by use of the thin resin layer $L_5$, the lens system can be made compact, and the cost can be reduced.

In addition, the projection lens according to Embodiment 10 is different from projection lens according to Embodiment 5 in the point that two masks 3a and 3b are provided.

Table 19 shows values of a curvature radius R of each lens surface of the projection lens according to Embodiment 10, an axial spacing D of each lens, a refractive index $N_d$ of each lens for a d-line, and an Abbe number $v_d$ of each lens for the d-line.

TABLE 19

| surface number | R | D | $N_d$ | $v_d$ |
|---|---|---|---|---|
| 1* | −2.9961 | 0.6826 | 1.49100 | 57.6 |
| 2* | −5.3830 | 1.3053 | | |
| 3 | −23.2963 | 0.2617 | 1.71300 | 53.9 |
| 4 | 2.9238 | 9.7935 | | |
| 5 | 5.7236 | 0.1718 | 1.71300 | 53.9 |
| 6 | 2.3904 | 0.3789 | 1.71736 | 29.5 |
| 7 | 19.9778 | 0.8907 | | |
| 8 | ∞ | 1.0240 | (mask) | |
| 9 | ∞ | 1.0754 | (stop) | |
| 10 | ∞ | 0.8533 | (mask) | |
| 11* | 57.7682 | 0.0171 | 1.52771 | 41.8 |
| 12 | 1,176.1096 | 0.5067 | 1.58913 | 61.2 |
| 13 | −2.1730 | 0.1138 | 1.83400 | 37.2 |
| 14 | 2.4000 | 0.7566 | 1.48749 | 70.2 |

TABLE 18

| Surface number | K | $A_3$ | $A_4$ | $A_5$ | $A_6$ | $A_7$ | $A_8$ | $A_{TZ,1/57}$ |
|---|---|---|---|---|---|---|---|---|
| 1 | −0.0143 | 1.8636 × 10⁻² | 1.2609 × 10⁻² | 2.0379 × 10⁻⁴ | −1.7564 × 10⁻³ | −2.0379 × 10⁻⁶ | 1.5939 × 10⁻⁴ | |
| 2 | 0.7361 | 1.4797 × 10⁻² | 1.4088 × 10⁻² | −2.7467 × 10⁻⁴ | −1.4280 × 10⁻³ | −8.3405 × 10⁻⁵ | 1.7324 × 10⁻² | |
| 10 | 1.0009 | 0.0000 | −2.1334 × 10⁻² | 1.3506 × 10⁻² | −8.8124 × 10⁻³ | −1.1798 × 10⁻² | 1.5771 × 10⁻³ | |

| surface number | $A_9$ | $A_{10}$ | $A_{11}$ | $A_{12}$ | $A_{13}$ | $A_{14}$ | $A_{15}$ |
|---|---|---|---|---|---|---|---|
| 1 | −9.0648 × 10⁻⁸ | −9.0166 × 10⁻⁶ | −1.5552 × 10⁻⁷ | 3.7622 × 10⁻⁷ | −1.3043 × 10⁻⁸ | −4.1346 × 10⁻¹⁰ | −6.3114 × 10⁻¹⁰ |
| 2 | 2.9844 × 10⁻³ | −8.8778 × 10⁻³ | 2.4401 × 10⁻³ | 2.8868 × 10⁻⁴ | 0.0000 | −3.8461 × 10⁻⁹ | 5.6040 × 10⁻⁹ |
| 10 | 1.8424 × 10⁻³ | 7.7124 × 10⁻⁵ | −4.1776 × 10⁻³ | −1.8989 × 10⁻⁴ | 0.0000 | 0.0000 | 0.0000 |

TABLE 19-continued

| surface number | R | D | $N_d$ | $v_d$ |
|---|---|---|---|---|
| 15 | −3.4769 | 0.5173 | | |
| 16 | 8.6821 | 0.9364 | 1.51633 | 64.1 |
| 17 | −2.6943 | 1.3903 | | |
| 18 | ∞ | 2.7306 | 1.80518 | 25.4 |
| 19 | ∞ | 4.0458 | 1.61272 | 58.7 |
| 20 | ∞ | | | |

The mark * designates an aspheric surface.

Each aspheric surface is defined by the aforementioned aspheric surface expression. Table 20 shows values of constants K and $A_3$-$A_{15}$ corresponding to each aspheric surface.

TABLE 20

| Surface number | K | $A_3$ | $A_4$ | $A_5$ | $A_6$ | $A_7$ | $A_8$ | $A_{TZ,1/57}$ |
|---|---|---|---|---|---|---|---|---|
| 1 | −0.8117 | $2.9712 \times 10^{-2}$ | $1.9088 \times 10^{-2}$ | $-1.8903 \times 10^{-3}$ | $-2.1857 \times 10^{-3}$ | | $3.2319 \times 10^{-5}$ | $1.8502 \times 10^{-4}$ |
| 2 | −2.0353 | $2.0301 \times 10^{-2}$ | $2.2399 \times 10^{-2}$ | $-1.3597 \times 10^{-3}$ | $-1.7473 \times 10^{-3}$ | | $-1.4363 \times 10^{-4}$ | $1.4170 \times 10^{-3}$ |
| 11 | 1.0000 | 0.0000 | $-8.2820 \times 10^{-3}$ | 0.0000 | $-1.4693 \times 10^{-3}$ | | 0.0000 | $-6.4098 \times 10^{-3}$ |

| surface number | $A_9$ | $A_{10}$ | $A_{11}$ | $A_{12}$ | $A_{13}$ | $A_{14}$ | $A_{15}$ |
|---|---|---|---|---|---|---|---|
| 1 | $5.2302 \times 10^{-6}$ | $-9.6008 \times 10^{-6}$ | $-8.3568 \times 10^{-7}$ | $4.4887 \times 10^{-7}$ | $-1.1097 \times 10^{-8}$ | $-3.4708 \times 10^{-10}$ | $-5.2272 \times 10^{-10}$ |
| 2 | 0.0000 | $9.7265 \times 10^{-4}$ | 0.0000 | $-1.2383 \times 10^{-3}$ | 0.0000 | $-3.2286 \times 10^{-9}$ | $4.6413 \times 10^{-9}$ |
| 11 | $-1.4096 \times 10^{-3}$ | $4.4291 \times 10^{-4}$ | $-4.1144 \times 10^{-3}$ | $-3.2142 \times 10^{-4}$ | 0.0000 | 0.0000 | 0.0000 |

Values corresponding to the conditional expressions (1)-(7) in Embodiment 10 are shown in Table 21 which will be described later. Thus, all the conditional expressions (1)-(7) are satisfied.

FIGS. 12-21 are aberration diagrams showing various aberrations (spherical aberration, astigmatism, distortion, and lateral color) of the projection lenses according to Embodiments 1-10 respectively. In these aberration diagrams, c designates a half view angle. Each spherical aberration diagram shows aberration curves for a d-line, an F-line and a C-line. Each lateral chromatic aberration diagram shows aberration curves for the F-line and the C-line with respect to the d-line. As shown in FIGS. 12-21, the projection lenses according to Embodiments 1-10 are formed as wide-angle and bright projection lenses where various aberrations including distortion aberration and lateral chromatic aberration are corrected well.

Projection lenses according to the invention are not limited to those in the aforementioned Embodiments, but various changes can be made on the invention. For example, the curvature radius R of each lens and the axial spacing D can be changed suitably.

Projection display apparatus according to the invention are not limited to the aforementioned configurations, but various apparatus configurations with projection lenses according to the invention can be arranged. For example, transmission type or reflection type liquid crystal display devices, or micro-mirror devices (e.g. digital micro-mirror devices made by Texas Instruments Incorporated) where a large number of micro-mirrors having variable inclinations are formed on a substantially flat plane, can be used as light valves. Suitable configurations corresponding to kinds of light valves can be used as lighting optics.

While the invention has been described with reference to the exemplary embodiments, the technical scope of the invention is not restricted to the description of the exemplary embodiments. It is apparent to the skilled in the art that various changes or improvements can be made. It is apparent from the description of claims that the changed or improved configurations can also be included in the technical scope of the invention.

What is claimed is:

1. A projection lens comprising: in order from a magnification side thereof,
   a first lens group having a negative refractive power, the first lens group consisting of an aspheric lens and a double-concave lens in this order from the magnification side;

TABLE 21

| | conditional expression | | | | | | | | |
|---|---|---|---|---|---|---|---|---|---|
| | (1) | (2) | (3) | (4) | (5) | (6) | (7) | (8) | (9) |
| Embodiment 1 | −2.54 | 5.37 | 8.07 | 3.11 | 15.14 | 1.55 | 88.8 | 1.19 | 30.60 |
| Embodiment 2 | −2.25 | 6.50 | 7.50 | 2.92 | 18.03 | 1.57 | 88.7 | 1.17 | 22.56 |
| Embodiment 3 | −2.62 | 4.80 | 10.68 | 4.38 | 15.11 | 1.88 | 88.6 | | 7625 |
| Embodiment 4 | −2.77 | 4.18 | 9.66 | 4.38 | 15.95 | 1.47 | 88.7 | | 86.97 |
| Embodiment 5 | −2.69 | 4.75 | 9.10 | 5.36 | 15.33 | 2.32 | 89.0 | | 26.22 |
| Embodiment 6 | −2.16 | 4.36 | 7.25 | 5.08 | 13.30 | 1.85 | 88.8 | | 51.54 |
| Embodiment 7 | −2.06 | 3.85 | 6.23 | 2.91 | 9.78 | 1.82 | 88.7 | | 289.6 |
| Embodiment 8 | −1.73 | 3.27 | 4.11 | 2.33 | 8.39 | 1.44 | 82.6 | | 24.84 |
| Embodiment 9 | −2.57 | 5.39 | 8.28 | 3.30 | 15.69 | 1.49 | 88.9 | 1.26 | |
| Embodiment 10 | −2.56 | 4.81 | 9.79 | 5.39 | 15.13 | 2.37 | 89.5 | | | a second lens group having a positive refractive power, the second lens group comprising one positive lens or comprising one positive lens and one negative lens; and a third lens group having a positive refractive power, the third lens group comprising three to five lenses including at least a cemented lens portion and a positive lens portion in this order from the magnification side, the three to five lenses including a surface closest to the magnification side as an aspheric surface, wherein the projection lens has a substantially telecentricity on a reduction side thereof;

the third lens group has a magnification-side focal position located in an air space between the third lens group and the second lens group;

the projection lens has a space between the first lens group and the second lens group, the space being the longest air space in the projection lens; and the projection lens satisfies conditional expressions (1) to (7):

$-3.5 < f_1/f < -1.2$ (1)

$2.5 < f_3/f < 8.0$ (2)

$3.5 < D_{12}/f < 15.0$ (3)

$2.0 < Bf/f < 8.0$ (4)

$7.5 < |ASf_1/f|$ (5)

$|FFd/f| < 3.0$ (6)

$75 \text{ degrees} < 2\omega$ (7)

wherein f designates a focal length of the projection lens;

$f_1$ designates a focal length of the first lens group;

$f_3$ designates a focal length of the third lens group;

$D_{12}$ designates an air space between the first lens group and the second lens group;

Bf designates an air-basis length between a reduction-side lens surface of a lens closest to the reduction side in the third lens group and a reduction-side image plane;

$ASf_1$ designates a focal length of the aspheric lens of the first lens group;

FFd designates a magnification-side focal position of the third lens group; and $2\omega$ designates a magnification-side view angle.

2. A projection lens comprising: in order from a magnification side thereof, a first lens group having a negative refractive power, the first lens group consisting of an aspheric lens and a double-concave lens in this order from the magnification side;

a second lens group having a positive refractive power, the second lens group comprising one positive lens or comprising one positive lens and one negative lens; and a third lens group having a positive refractive power, the third lens group comprising three to five lenses including at least a cemented lens portion and a positive lens portion in this order from the magnification side, the three to five lenses including a surface closest to the magnification side as an aspheric surface, wherein the projection lens has a substantially telecentricity on a reduction side thereof;

the second and third lens groups constitutes a composite lens group having a magnification-side focal position located in an air space between the second lens group and the first lens group;

the projection lens has a space between the first lens group and the second lens group, the space being the longest air space in the projection lens; and the projection lens satisfies conditional expressions (1) to (7):

$-3.5 < f_1/f < -1.2$ (1)

$2.5 < f_3/f < 8.0$ (2)

$3.5 < D_{12}/f < 15.0$ (3)

$2.0 < Bf/f < 8.0$ (4)

$7.5 < |ASf_1/f|$ (5)

$|FFd/f| < 3.0$ (6)

$75 \text{ degrees} < 2\omega$ (7)

wherein f designates a focal length of the projection lens;

$f_1$ designates a focal length of the first lens group;

$f_3$ designates a focal length of the third lens group;

$D_{12}$ designates an air space between the first lens group and the second lens group;

Bf designates an air-basis length between a reduction-side lens surface of a lens closest to the reduction side in the third lens group and a reduction-side image plane;

$ASf_1$ designates a focal length of the aspheric lens of the first lens group;

FFd designates a magnification-side focal position of the composite lens group of the second and third lens groups; and $2\omega$ designates a magnification-side view angle.

3. The projection lens according to claim 2, further satisfying conditional expression (8):

$D_{23}/f < 2.0$ (8)

wherein $D_{23}$ designates an air space between the second lens group and the third lens group.

4. The projection lens according to claim 1, wherein the third lens group comprises: a single aspheric lens having an aspheric surface at least on the magnification side; the cemented lens portion comprising two or three lenses cemented with each other; and the positive lens portion comprising a single lens, in this order from the magnification side, and the third lens group satisfies conditional expression (9)

$10.0 < |ASf_3/f|$ (9)

wherein $ASf_3$ designates a focal length of the single aspheric lens in the third lens group.

5. The projection lens according to claim 1, wherein the third lens group comprises: a single aspheric lens having an aspheric surface at least on the magnification side; the cemented lens portion comprises one negative lens and one positive lens cemented with each other; and the positive lens portion comprising one of a single lens and a cemented lens consisting of two lenses cemented with each other, in this order from the magnification side, and the third lens group satisfies conditional expression (9)

$10.0 < |ASf_3/f|$ (9)

wherein $ASf_3$ designates a focal length of the single aspheric lens in the third lens group.

6. The projection lens according to claim 1, wherein the third lens group comprises: the cemented lens portion comprising two or three lenses cemented with each other and having a surface closest to the magnification side as the aspheric surface; and the positive lens portion, in this order from the magnification side.

7. The projection lens according to claim 6, wherein the cemented lens portion has a resin layer on the magnification side, the resin layer having the surface closest to the magnification side as the aspheric surface.

8. The projection lens according to claim 1, wherein the second lens group consists of the one positive lens.

9. The projection lens according to claim 1, further comprises an optical path deflection unit that deflects an optical path, the optical path deflection unit being disposed between the first lens group and the second lens group.

10. The projection lens according to claim 1, wherein the aspheric lens in the first lens group is moved in an optical axis direction of the first lens group in accordance with a change of a projection distance so as to correct a field curvature caused by the change of the projection distance.

11. The projection lens according to claim 2, wherein the third lens group comprises: a single aspheric lens having an aspheric surface at least on the magnification side; the cemented lens portion comprising two or three lenses cemented with each other; and the positive lens portion comprising a single lens, in this order from the magnification side, and the third lens group satisfies conditional expression (9)

$$10.0 < |ASf_3/f| \tag{9}$$

wherein $ASf_3$ designates a focal length of the single aspheric lens in the third lens group.

12. The projection lens according to claim 2, wherein the third lens group comprises: a single aspheric lens having an aspheric surface at least on the magnification side; the cemented lens portion comprises one negative lens and one positive lens cemented with each other; and the positive lens portion comprising one of a single lens and a cemented lens consisting of two lenses cemented with each other, in this order from the magnification side, and the third lens group satisfies conditional expression (9)

$$10.0 < |ASf_3/f| \tag{9}$$

wherein $ASf_3$ designates a focal length of the single aspheric lens in the third lens group.

13. The projection lens according to claim 2, wherein the third lens group comprises: the cemented lens portion comprising two or three lenses cemented with each other and having a surface closest to the magnification side as the aspheric surface; and the positive lens portion, in this order from the magnification side.

14. The projection lens according to claim 13, wherein the cemented lens portion has a resin layer on the magnification side, the resin layer having the surface closest to the magnification side as the aspheric surface.

15. The projection lens according to claim 2, wherein the second lens group consists of the one positive lens.

16. The projection lens according to claim 2, further comprises an optical path deflection unit that deflects an optical path, the optical path deflection unit being disposed between the first lens group and the second lens group.

17. The projection lens according to claim 2, wherein the aspheric lens in the first lens group is moved in an optical axis direction of the first lens group in accordance with a change of a projection distance so as to correct a field curvature caused by the change of the projection distance.

18. A projection display apparatus comprising:
a light source;
a light valve;
a lighting optical portion for guiding a light beam from the light source to the light valve; and
a projection lens according to claim 1;
wherein the light beam from the light source is optically modulated by the light valve and projected on a screen by the projection lens.

19. A projection display apparatus comprising:
a light source;
a light valve;
a lighting optical portion for guiding a light beam from the light source to the light valve; and
a projection lens according to claim 2;
wherein the light beam from the light source is optically modulated by the light valve and projected on a screen by the projection lens.

* * * * *